United States Patent
Yamamura et al.

(10) Patent No.: US 8,207,953 B2
(45) Date of Patent: Jun. 26, 2012

(54) BACKLIGHT APPARATUS AND DISPLAY APPARATUS

(75) Inventors: Akihiro Yamamura, Osaka (JP); Takahiro Kobayashi, Okayama (JP); Hideyuki Nakanishi, Okayama (JP); Toshiki Onishi, Osaka (JP); Seiji Hamada, Osaka (JP); Atsushi Nakanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/726,787

(22) Filed: Mar. 18, 2010

(65) Prior Publication Data

US 2010/0220048 A1    Sep. 2, 2010

Related U.S. Application Data

(63) Continuation of application No. PCT/JP2009/004854, filed on Sep. 25, 2009.

(30) Foreign Application Priority Data

Sep. 29, 2008  (JP) ................................. 2008-250117

(51) Int. Cl.
    *G06F 3/038*  (2006.01)
(52) U.S. Cl. ........................................ 345/204; 345/102
(58) Field of Classification Search .................. 345/102, 345/204

See application file for complete search history.

(56) References Cited

U.S. PATENT DOCUMENTS 7,460,103 B2 * 12/2008 Konno et al. .................. 345/102
2006/0007107 A1 * 1/2006 Ferguson ...................... 345/102
2008/0042927 A1   2/2008 Jung et al.
2009/0140665 A1 * 6/2009 Park ............................... 315/291
2009/0231313 A1 * 9/2009 Teranishi et al. ............. 345/207
2010/0013866 A1   1/2010 Okabe

FOREIGN PATENT DOCUMENTS

| JP | 2005-258403 | 9/2005 |
|---|---|---|
| JP | 2007-334313 | 12/2007 |
| JP | 2008-051905 | 3/2008 |
| JP | 2008-176211 | 7/2008 |
| JP | 2008-203292 | 9/2008 |
| JP | 2008-209508 | 9/2008 |
| JP | 2009-139910 | 6/2009 |

* cited by examiner

*Primary Examiner* — Nitin Patel
*Assistant Examiner* — Carolyn R Edwards
(74) *Attorney, Agent, or Firm* — Hamre, Schumann, Mueller & Larson, P.C.

(57) ABSTRACT

The backlight apparatus allows brightness control with minimum image quality deterioration. This apparatus has: an illuminating section that radiates illumination light on a back of a liquid crystal panel comprising a plurality of image display areas; and a brightness determining section that determines a light emission brightness value of the illuminating section and renews a light emitting state of the illuminating section, based on the determined light emission brightness value. The illuminating section has light emitting areas illuminating each of a plurality of image display areas. The brightness determining section determines light emission brightness values of the image display areas, from values acquired by applying weights to the information based on input image signals of the image display areas, and changes the weights for the information based on luminance of ambient light surrounding the backlight apparatus.

10 Claims, 31 Drawing Sheets

| | ROW 1 | ROW 2 | ROW 3 | ROW 4 | ROW 5 | ROW 6 |
|---|---|---|---|---|---|---|
| COLUMN j | 0 | 0 | 0 | 0 | 0 | 0 |
| COLUMN i | 0 | 0 | 0 | 0 | 0 | 0 |
| COLUMN h | 0 | 64 | 128 | 128 | 64 | 0 |
| COLUMN g | 0 | 128 | 255 | 255 | 128 | 0 |
| COLUMN f | 0 | 64 | 128 | 128 | 64 | 0 |
| COLUMN e | 0 | 0 | 0 | 0 | 0 | 0 |
| COLUMN d | 0 | 0 | 0 | 0 | 0 | 0 |
| COLUMN c | 0 | 0 | 64 | 0 | 0 | 0 |
| COLUMN b | 0 | 0 | 0 | 0 | 0 | 0 |
| COLUMN a | 0 | 0 | 0 | 0 | 0 | 0 |

FIG.10

| | ROW 1 | ROW 2 | ROW 3 | ROW 4 | ROW 5 | ROW 6 |
|---|---|---|---|---|---|---|
| COLUMN j | 0 | 0 | 0 | 0 | 0 | 0 |
| COLUMN i | 4 | 12 | 20 | 20 | 12 | 4 |
| COLUMN h | 12 | 63.9 | 115.9 | 115.9 | 63.9 | 12 |
| COLUMN g | 16 | 103.9 | 191.4 | 191.4 | 103.9 | 16 |
| COLUMN f | 12 | 63.9 | 115.9 | 115.9 | 63.9 | 12 |
| COLUMN e | 4 | 12 | 20 | 20 | 12 | 4 |
| COLUMN d | 0 | 4 | 4 | 4 | 0 | 0 |
| COLUMN c | 0 | 4 | 32 | 4 | 0 | 0 |
| COLUMN b | 0 | 4 | 4 | 4 | 0 | 0 |
| COLUMN a | 0 | 0 | 0 | 0 | 0 | 0 |

|  | ROW 2 | ROW 3 | ROW 4 | ROW 5 |
|---|---|---|---|---|
| COLUMN g |  |  |  |  |
| COLUMN f |  | 2/24 | 2/24 | 2/24 |
| COLUMN e |  | 2/24 | 8/24 | 2/24 |
| COLUMN d |  | 2/24 | 2/24 | 2/24 |
| COLUMN c |  |  |  |  |

|  | ROW 1 | ROW 2 | ROW 3 | ROW 4 | ROW 5 |
|---|---|---|---|---|---|
| COLUMN g | 0.5/48 | 0.5/48 | 0.5/48 | 0.5/48 | 0.5/48 |
| COLUMN f | 0.5/48 | 2/48 | 2/48 | 2/48 | 0.5/48 |
| COLUMN e | 0.5/48 | 2/48 | 24/48 | 2/48 | 0.5/48 |
| COLUMN d | 0.5/48 | 2/48 | 2/48 | 2/48 | 0.5/48 |
| COLUMN c | 0.5/48 | 0.5/48 | 0.5/48 | 0.5/48 | 0.5/48 |

|         | ROW 1   | ROW 2   | ROW 3   | ROW 4   | ROW 5   |
|---------|---------|---------|---------|---------|---------|
| COLUMN g | 0.25/48 | 0.25/48 | 0.25/48 | 0.25/48 | 0.25/48 |
| COLUMN f | 0.25/48 | 2.5/48  | 2.5/48  | 2.5/48  | 0.25/48 |
| COLUMN e | 0.25/48 | 2.5/48  | 24/48   | 2.5/48  | 0.25/48 |
| COLUMN d | 0.25/48 | 2.5/48  | 2.5/48  | 2.5/48  | 0.25/48 |
| COLUMN c | 0.25/48 | 0.25/48 | 0.25/48 | 0.25/48 | 0.25/48 |

FIG.30

|  | ROW 1 | ROW 2 | ROW 3 | ROW 4 | ROW 5 |
|---|---|---|---|---|---|
| COLUMN g | 0.75/48 | 0.75/48 | 0.75/48 | 0.75/48 | 0.75/48 |
| COLUMN f | 0.75/48 | 1.5/48 | 1.5/48 | 1.5/48 | 0.75/48 |
| COLUMN e | 0.75/48 | 1.5/48 | 24/48 | 1.5/48 | 0.75/48 |
| COLUMN d | 0.75/48 | 1.5/48 | 1.5/48 | 1.5/48 | 0.75/48 |
| COLUMN c | 0.75/48 | 0.75/48 | 0.75/48 | 0.75/48 | 0.75/48 |

FIG.31

BACKLIGHT APPARATUS AND DISPLAY APPARATUS

CROSS REFERENCE TO RELATED APPLICATIONS

This application is a continuation of International Patent Application No. PCT/JP2009/004854, filed on Sep. 25, 2009, the disclosure of which is incorporated herein by reference in its entirety. The disclosure of International Patent Application No. PCT/JP2009/004854, filed on Sep. 25, 2009, including the specification, drawings and abstract is incorporated herein by reference in its entirety.

TECHNICAL FIELD

The technical field relates to a backlight apparatus and a display apparatus using this backlight apparatus. More particularly, the technical field relates to a backlight apparatus and display apparatus for controlling the lighting of a plurality of divided areas.

BACKGROUND ART

Non-self-luminous display apparatuses represented by liquid crystal display apparatuses have backlight apparatuses (hereinafter, simply "backlight") in the back. These display apparatuses display images through an optical modulating section. According to image signals, the optical modulating section adjusts the reflectance or transmittance of light emitted from the backlight. To expand the dynamic range of display brightness, these display apparatuses employ a configuration where the illuminating section of the backlight is divided into a plurality of areas and brightness is controlled on a per area basis.

With the configuration as described above, in terms of cost, it is difficult to make the number of divisions of the backlight (i.e. the resolution of the backlight) the same as the resolution of the optical modulating section. Accordingly, the resolution of the backlight is usually lower than the resolution of the optical modulating section. Therefore, problems occur due to the difference in resolution between the backlight and the optical modulating section. One of the problems is the phenomenon where a part that must be displayed in black becomes bright and appears distinctly (hereinafter, "black floating"). This problem will be explained below using FIG. 1 and FIG. 2.

FIG. 1 illustrates the state of "black floating" in still images. FIG. 1A shows input image 900 (or it may be considered as a modulation state of the optical modulating section). In input image 900, there is a circular object with a high peak brightness on a black background. Note that the broken lines on input image 900 indicate the positions of divided areas of the backlight for ease of understanding, and are not included in the input image. According to this input image, the optical modulating section such as a liquid crystal panel is controlled. To be more specific, the aperture ratio of the liquid crystal panel is controlled such that more light transmits in parts of higher brightness.

FIG. 1B shows the light emitting state of backlight 910. Here, backlight 910 has nine divided areas. Here, assume that the above-described circular object is completely included in the area located in the center of backlight 910 (hereinafter simply "center area"). The center area includes a circular object with high peak brightness in input image 900 as described above, and therefore emits light at brightness matching the image of this area. Then, surrounding areas are turned off because the overall images of these areas are black.

FIG. 1C shows display image 920 displayed on the display apparatus. In this way, in the center area, even black part practically allows a small amount of light to transmit. Therefore, the difference in the brightness of the black color of the background is produced between the center area and the areas adjacent to this center area. As a result, "black floating" is produced distinctly in the center area compared to the neighboring areas.

Although a case of still images has been explained with FIG. 1, a case of moving images will be explained using FIG. 2.

FIG. 2 illustrates the state of "black floating" in moving images. FIG. 2A shows that a circular object moves from the left to the right in same input image 900 as in FIG. 1A.

FIG. 2B shows how the light emitting state of backlight 910 transitions. When the circular object moves to the right and crosses over two light emitting areas, both light emitting areas emit light. Therefore, compared to the time the circular object is included in only one light emitting area, the light emitting area becomes larger. Then, when the circular object moves further to the right, the circular object is included in one area again and only one light emitting area emits light.

FIG. 2C shows how display image 920 displayed on the display apparatus transitions. In this way, when an object having different brightness from the surroundings moves, the area of the above-described "black floating" part changes at the timing the object crosses over light emitting areas. When the area of light emitting areas changes in this way, "black floating" is more likely to be seen.

As a method of reducing such "black floating," Patent Literature 1, for example, discloses a configuration "having a neighboring area lighting means for making a backlight light the areas of a predetermined width adjacent to non-lighting areas, which are adjacent to divided areas illuminated based on an image signal, at lower brightness than the brightness of divided areas that are illuminated" to perform backlight brightness control.

Citation List

Patent Literature

PTL 1: Japanese Patent Application Laid-Open No. 2008-51905

SUMMARY

Technical Problem

By the way, the liquid crystal display apparatus disclosed in Patent Literature 1 decides whether to correct the brightness of, for example, the surrounding areas (i.e. areas other than the center area) in FIG. 1B, based on the threshold for the difference in brightness with respect to the center area. Therefore, when the difference in brightness between the center area and surrounding areas exceeds the threshold, there is a possibility that the brightness of the surrounding areas becomes discontinuous in time. Cases may occur where viewers recognize discontinuities in brightness.

The object is to provide a backlight apparatus and a display apparatus that allow brightness control with minimum image quality deterioration.

Solution to Problem

In order to achieve to the above object, the backlight apparatus has: an illuminating section that radiates illumination light on a back of an optical modulating section which comprises a plurality of image display areas and which displays an image by modulating per image display area the illumination light according to an image signal; and a brightness determining section that determines a light emission brightness value of the illuminating section and renews a light emitting state of the illuminating section based on the determined light emission brightness value, and the illuminating section comprises a plurality of light emitting areas illuminating the plurality of image display areas, respectively; and the brightness determining section determines a light emission brightness value of a light emitting area illuminating a first image display area, from values acquired by applying weights to first information based on an input image signal of the first image display area and second information based on an input image signal of a second image display area, and changes the weights for the first information and the second information based on luminance of ambient light surrounding the backlight apparatus.

Further, the backlight apparatus has: an illuminating section that radiates illumination light on a back of an optical modulating section which comprises a plurality of image display areas and which displays an image by modulating per image display area the illumination light according to an image signal; and a brightness determining section that determines a light emission brightness value of the illuminating section and renews a light emitting state of the illuminating section based on the determined light emission brightness value, and the illuminating section comprises a plurality of light emitting areas illuminating the plurality of image display areas, respectively; and the brightness determining section determines a light emission brightness value of a light emitting area illuminating a first image display area, from values acquired by applying weights to first information based on an input image signal of the first image display area and second information based on an input image signal of a second image display area, and changes the number of items of second information used to determine the light emission brightness value of the light emitting area illuminating the first image display area based on luminance of ambient light surrounding the backlight apparatus.

Further, the display apparatus employs a configuration including the above backlight apparatus and the above optical modulating section.

Advantageous Effects

According to the present invention, it is possible to provide a backlight apparatus and display apparatus that allow brightness control with minimum image quality deterioration.

BRIEF DESCRIPTION OF DRAWINGS

FIG. 10 shows the reference brightness value of each light emitting area in a light emitting section which is calculated in a brightness calculating section according to Embodiment 1;

FIG. 13 shows weighted brightness values outputted from a weighting section according to Embodiment 1;

FIG. 14 illustrates calculation of light emission brightness values according to Embodiment 1;

FIG. 19 illustrates weights in case of M:N=2:1 according to Embodiment 1;

FIG. 20 illustrates weights in case of M:N=1:2 according to Embodiment 1;

FIG. 21 illustrates a case of decreasing weights applied to reference brightness values of light emitting areas located diagonally according to Embodiment 1;

FIG. 22 illustrates a case of applying weights to reference brightness values of light emitting areas of five rows and five columns according to Embodiment 1;

FIG. 30 illustrates the first case where second weights alone are changed based on ambient light luminance according to Embodiment 4; and FIG. 31 illustrates the second case where second weights alone are changed according to ambient light luminance according to Embodiment 4.

DESCRIPTION OF EMBODIMENTS

Embodiment 1

Hereinafter, Embodiment 1 (an embodiment of applying weights to reference brightness values), which is an example where the present invention is applied to a liquid crystal display apparatus, will be explained with reference to the accompanying drawings.

<1-1. Configuration of Liquid Crystal Display Apparatus>

First, the configuration of the liquid crystal display apparatus will be explained.

Figure 1:
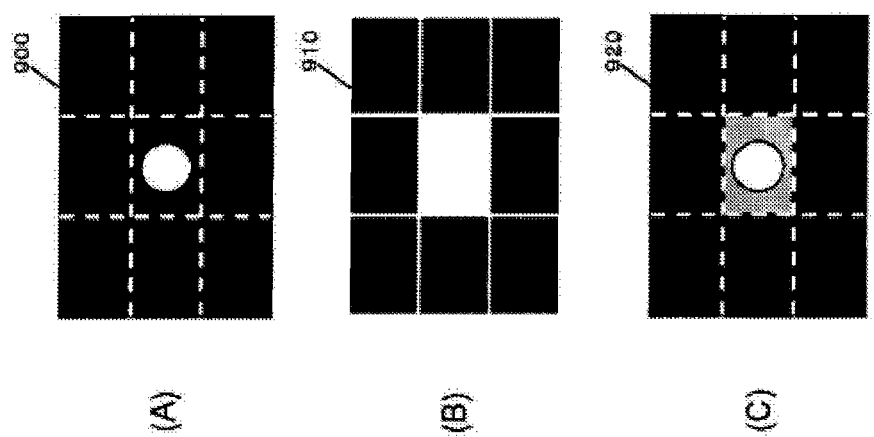
FIG. 1 illustrates the state of "black floating" in still images.
Figure 2:
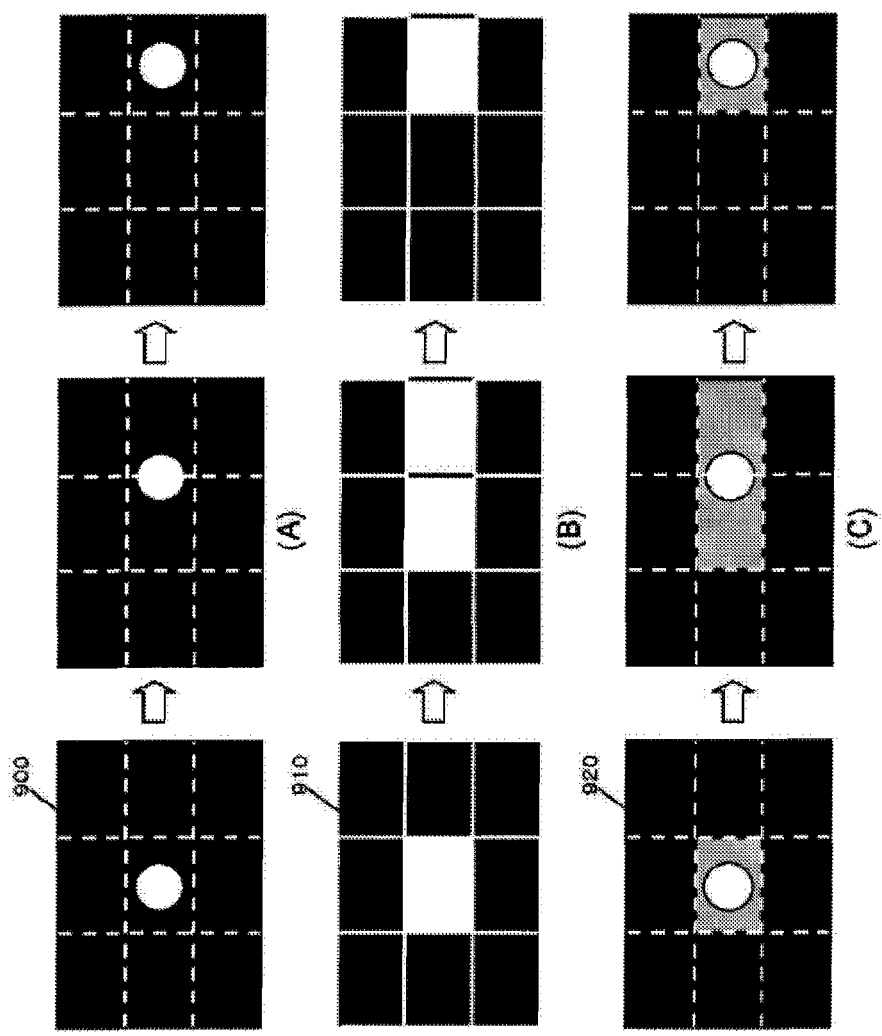
FIG. 2 illustrates the state of "black floating" in moving images.
Figure 3:
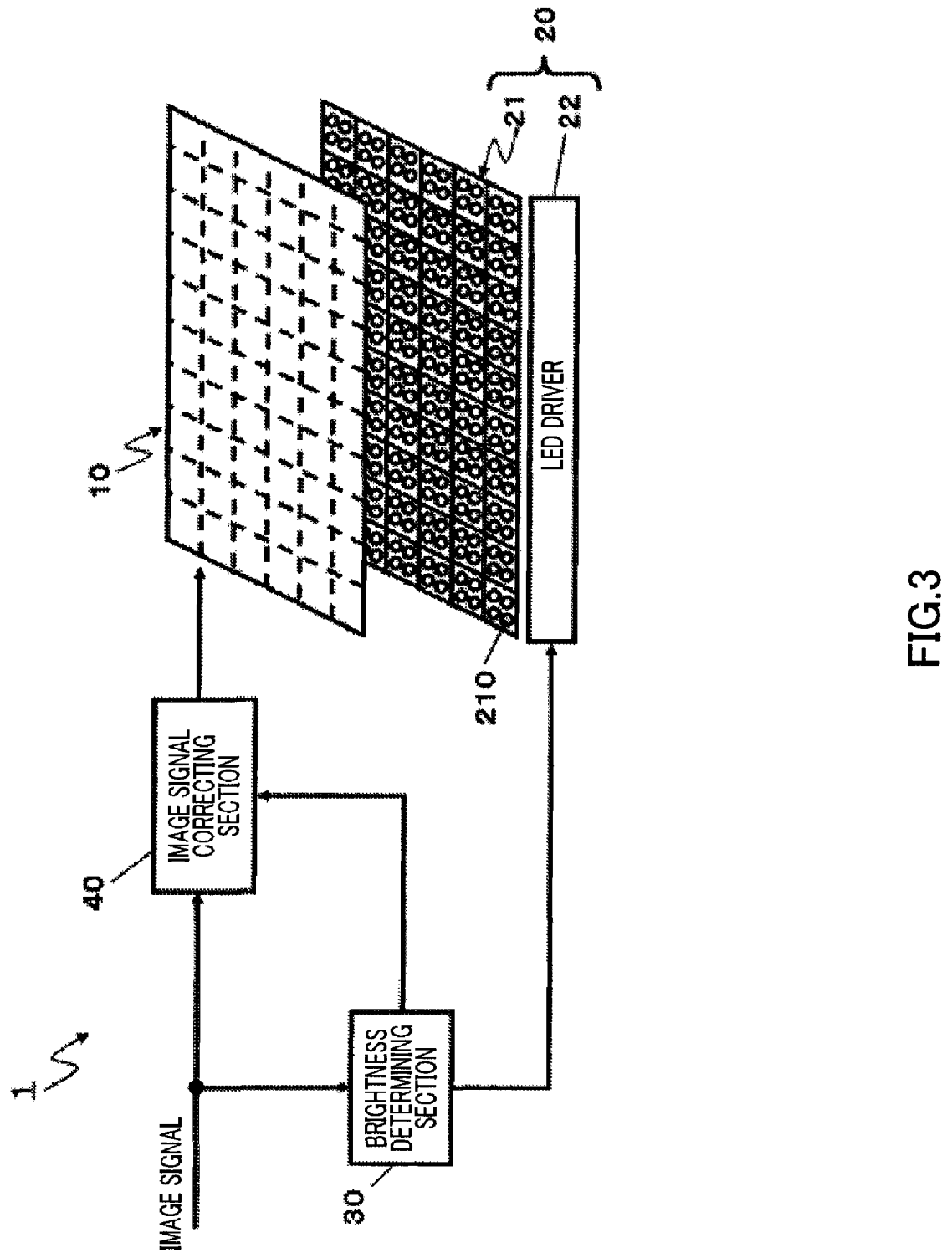
FIG. 3 is a configuration diagram showing an overall configuration of a liquid crystal display apparatus according to Embodiment 1.

FIG. 3 is a configuration diagram showing the overall configuration of the liquid crystal display apparatus. Roughly, liquid crystal display apparatus 1 has liquid crystal panel 10, illuminating section 20, brightness determining section 30, and image signal correcting section 40. Hereinafter, illuminating section 20 and brightness determining section 30 will be collectively referred to as "backlight." The configuration of each section will be explained below in detail.

<1-1-1. Liquid Crystal Panel>

Liquid crystal panel 10 modulates illumination light that is radiated on its back, according to an image signal, and displays an image.

Liquid crystal panel 10 has a plurality of image display areas as indicated by broken lines in the figure. Each image display area has a plurality of pixels.

Liquid crystal panel 10 is formed by providing a liquid crystal layer divided per pixel, in a glass substrate. In liquid crystal panel 10, a signal voltage is applied to the liquid crystal layer matching each pixel by the gate driver (not shown) and source driver (not shown), and the aperture ratio is controlled per pixel. Liquid crystal panel 10 uses the IPS (In Plane Switching) scheme. The IPS scheme is a scheme functioning in a simple manner where liquid crystal molecules rotate in parallel with the glass substrate. Consequently, a liquid crystal panel that employs the IPS scheme provides a wide view angle, and has characteristics that change in color hue is little depending on directions in which the liquid crystal panel is seen and change in color hue is little in the full tonal gradation.

Further, liquid crystal panel 10 is an example of the optical modulating section. Other schemes such as the VA (Vertical Alignment) scheme may be employed as the scheme for the liquid crystal panel.

<1-1-2. Illuminating Section>

Illuminating section 20 radiates illumination light on liquid crystal panel 10 from the back of liquid crystal panel 10, so that liquid crystal panel 10 displays an image.

Illuminating section 20 has light emitting section 21 formed with a plurality of light emitting areas. Each light emitting area is provided to face each image display area of liquid crystal panel 10 and mainly illuminates the facing image display area. Here, the word "mainly" suggests that each light emitting area may radiate part of its illumination light on other image display areas that the light emitting area does not face. Each light emitting area has four LEDs 210 as the light sources. Further, illuminating section 20 has LED driver 22 for driving LEDs 210 of light emitting section 21.

LED driver 22 has 60 driving circuits (not shown) corresponding to the total number of light emitting areas, so that it is possible to drive each light emitting area independently.

With the above configuration, illuminating section 20 allows brightness control per light emitting area.

Figure 4:
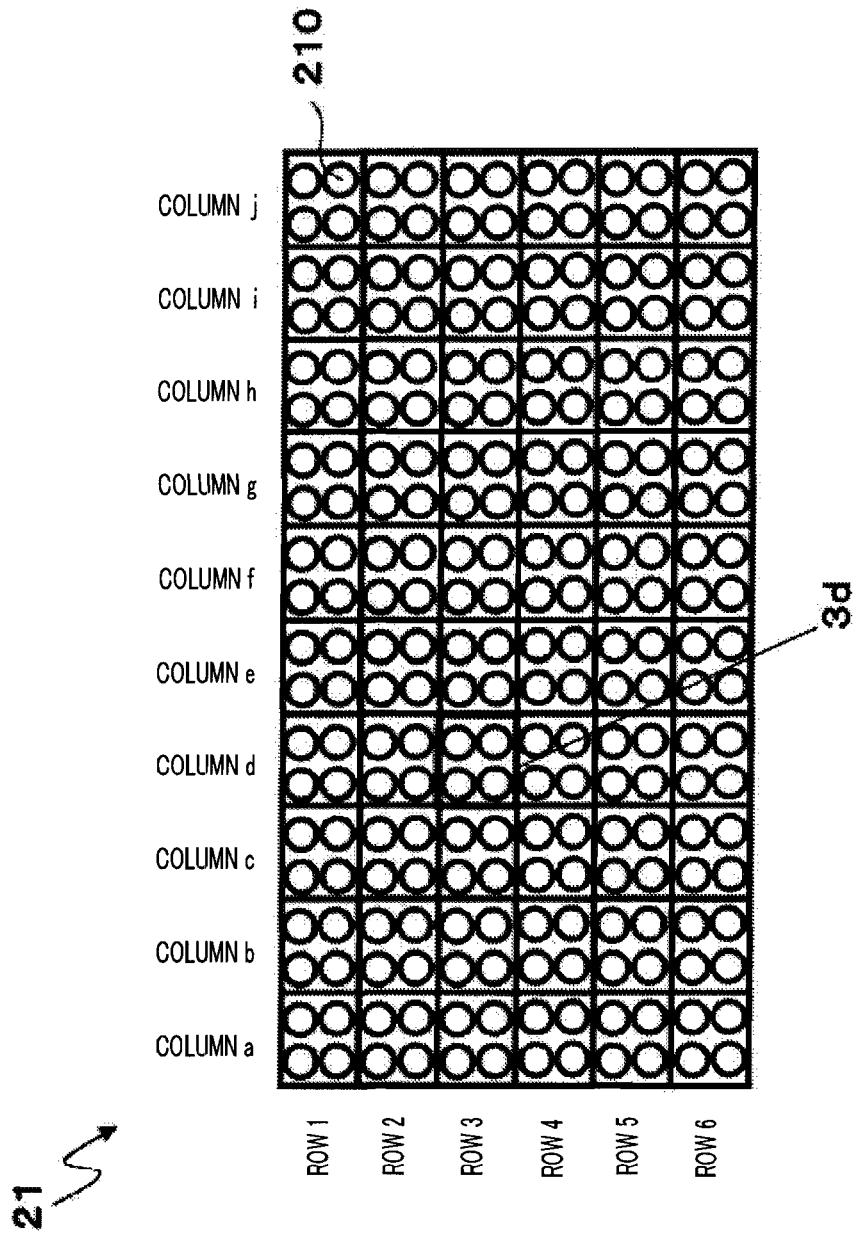
FIG. 4 is a configuration diagram showing a configuration of a light emitting section and liquid crystal panel according to Embodiment 1.

FIG. 4 is a configuration diagram showing the configuration of light emitting section 21. Light emitting section 21 has a total of 60 light emitting areas of six rows and ten columns. Here, each light emitting area is specified by a combination of an Arabic reference numeral corresponding to the row number and an alphabetical reference numeral corresponding to the column number. For example, in FIG. 4, the light emitting area corresponding to row number 3 and column number d is referred to as "light emitting area 3d."

LED 210 emits white light. Four LEDs 210 belonging to one light emitting area are connected to one driving circuit of LED driver 22. Further, four LEDs 210 belonging to one light emitting area emit light at the same brightness, according to signals from LED driver 22.

Further, LED 210 is not limited to LEDs that emit white light directly. LED 210 may emit white light by blending, for example, light of three colors of red, green and blue. Further, the number of LEDs 210 belonging to one light emitting area is not limited to four. More LEDs or fewer LEDs may be used.

<1-1-3. Brightness Determining Section>

Brightness determining section 30 determines the light emission brightness value of each of a plurality of light emitting areas included in illuminating section 20, based on the input image signal. The input image signal is formed by arranging image signals of a plurality of image display areas included in liquid crystal panel 10, in a time sequence. That is, brightness determining section 30 receives as input an input image signal of each image display area of liquid crystal panel 10, and outputs the light emission brightness value of each light emitting area, to LED driver 22 of illuminating section 20. Further, brightness determining section 30 outputs the light emission brightness value of each light emitting area to image signal correcting section 40.

Particularly, the characteristics of liquid crystal display apparatus 1 include that brightness determining section 30 determines the light emission brightness value of one light emitting area, from the values acquired by applying weights to information based on the input image signal of the first image display area (i.e. first information) and the information based on the input image signal of second image display areas (i.e. second information). The first image display area refers to the image display area that the light emitting area for which the light emission brightness value is determined illuminates mainly. A second image display area refers to a different image display area from the image display area that the light emitting area for which the light emission brightness value is determined illuminates mainly.

Figure 5:
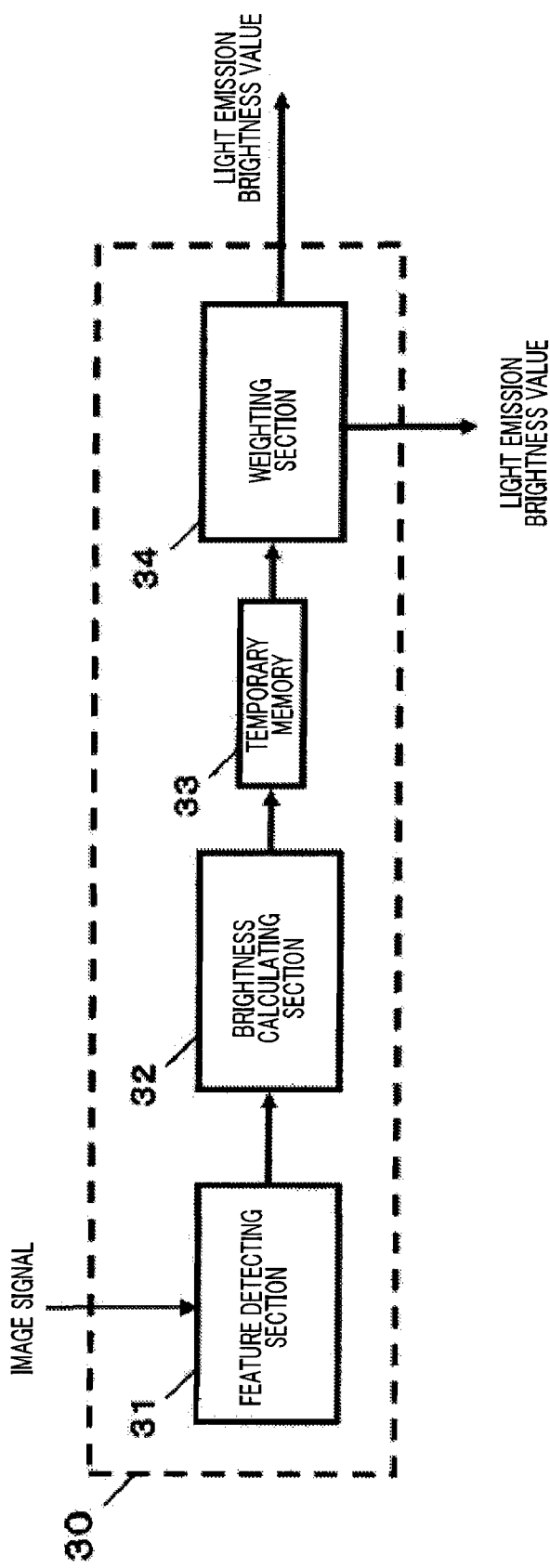
FIG. 5 is a configuration diagram showing a configuration of a brightness determining section according to Embodiment 1.

FIG. 5 is a configuration diagram showing a specific configuration of brightness determining section 30. Roughly, brightness determining section 30 has feature detecting section 31, brightness calculating section 32, temporary memory 33 and weighting section 34.

<1-1-3-1. Feature Detecting Section>

Feature detecting section 31 detects the feature amount of an input image signal per image display area. Hereinafter, a "feature amount" refers to a value that is used directly to calculate a reference brightness value (described later). Here, an average value of brightness signals of individual pixels (hereinafter "average brightness value") will be used as a feature amount. The brightness signal of each pixel is included in an input image signal. That is, feature detecting section 31 receives as input an image signal, and detects an average brightness value per image display area. Then, feature detecting section 31 outputs the detected feature amount sequentially to brightness calculating section 32.

<1-1-3-2. Brightness Calculating Section>

Brightness calculating section 32 calculates the reference brightness value of each light emitting area, based on the input feature amount. To be more specific, using conversion tables, brightness calculating section 32 converts the average brightness value into a reference brightness value on a per image display area basis, and outputs the reference brightness value to temporary memory 33. A "reference brightness value" refers to a value which serves as a reference when the brightness value (hereinafter "light emission brightness value") to apply to a light emitting area of interest is calculated.

Figure 6:
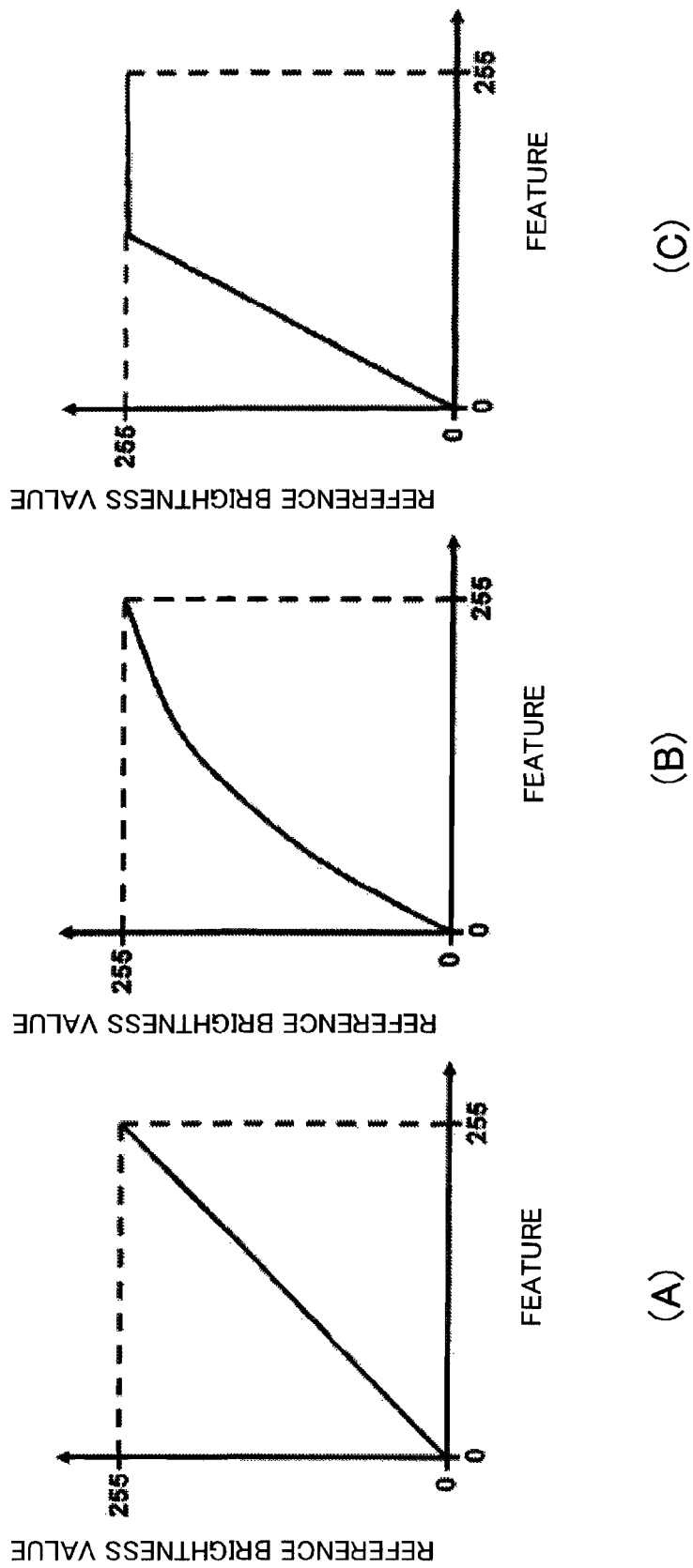
FIG. 6 shows an example of the characteristics of conversion tables for converting feature amounts into reference brightness values according to Embodiment 1.

FIG. 6 shows an example of the characteristics of conversion tables for converting the feature amount into a reference brightness value. In FIG. 6A to FIG. 6C, the horizontal axis represents the feature amount, and the vertical axis represents the reference brightness value.

For example, in case where a conversion table having the characteristics shown in FIG. 6A is used, the feature amount is converted into the same value as the reference brightness value. For example, if the feature amount is 0, the reference brightness value is 0, and, if the feature amount is 255, the reference brightness is 255. Further, in case where, for example, the curve of the feature amount is corrected, it is equally possible to use a conversion table having the characteristics shown in FIG. 6B. Furthermore, in case where the reference brightness value is saturated at or above a predetermined feature amount, it is equally possible to use a conversion table having the characteristics shown in FIG. 6C. By using these conversion tables, brightness calculating section 32 can adjust the light emission brightness of light emitting section 21 for an input image signal.

For example, in case where the feature amount is the average brightness value, the feature amount becomes small in an image in which there is a very small white light spot on a black background. Therefore, cases occur where the brightness of the white light spot becomes too low. In this case, a conversion table having the characteristics shown in FIG. 6C makes the brightness of the white light spot look better than a conversion table having the characteristics shown in FIG. 6A. This is because, with the characteristics shown in FIG. 6C, a comparatively high reference brightness value matches a small feature amount.

Accordingly, it is preferable that brightness calculating section 32 provides a plurality of conversion tables of different characteristics in advance and switches between these conversion tables to use according to the state of the image, so as to acquire better image quality. In this way, brightness calculating section 32 can adaptively switch the conversion table to use to calculate the reference brightness value according to images.

Further, although a case has been explained with the present embodiment where conversion tables are used, the present invention is not limited to this. For example, using conversion functions having the above-described conversion characteristics, brightness calculating section 32 may convert feature amounts into reference brightness values when necessary. According to this configuration, it is possible to reduce the amount of the memory.

<1-1-3-3. Temporary Memory>

Temporary memory 33 stores the reference brightness values outputted from brightness calculating section 32. That is, temporary memory 33 sequentially stores the reference brightness value on a per light emitting area basis, and stores the reference brightness values of all light emitting areas on a temporary basis.

<1-1-3-4. Weighting Section>

Weighting section 34 determines the light emission brightness value of the first light emitting area, from the values acquired by applying weights to the reference brightness value of the first light emitting area, which is the first information, and the reference brightness values of second light emitting areas, which are second information. That is, to determine the light emission brightness value of one light emitting area (i.e. the first light emitting area), weighting section 34 retrieves the reference brightness value (i.e. first information) for this one light emitting area stored in temporary memory 33. Further, weighting section also retrieves from temporary memory 33 the reference brightness values (i.e. second information) of predetermined light emitting areas (i.e. second light emitting areas) different from that one light emitting area. Then, weighting section 34 applies weights to a plurality of retrieved reference brightness values, adds a plurality of values to which weights have been applied (hereinafter "weighted brightness values") and determines the final light emission brightness value of that light emitting area (i.e. the first light emitting area).

With the present embodiment, "second light emitting areas" refer to eight neighboring light emitting areas surrounding the first light emitting area. For example, to illustrate using FIG. 4, in case where the first light emitting area is light emitting area 3d, the second light emitting areas are light emitting areas 2c, 2d, 2e, 3c, 3e, 4c, 4d and 4e.

Figure 7:
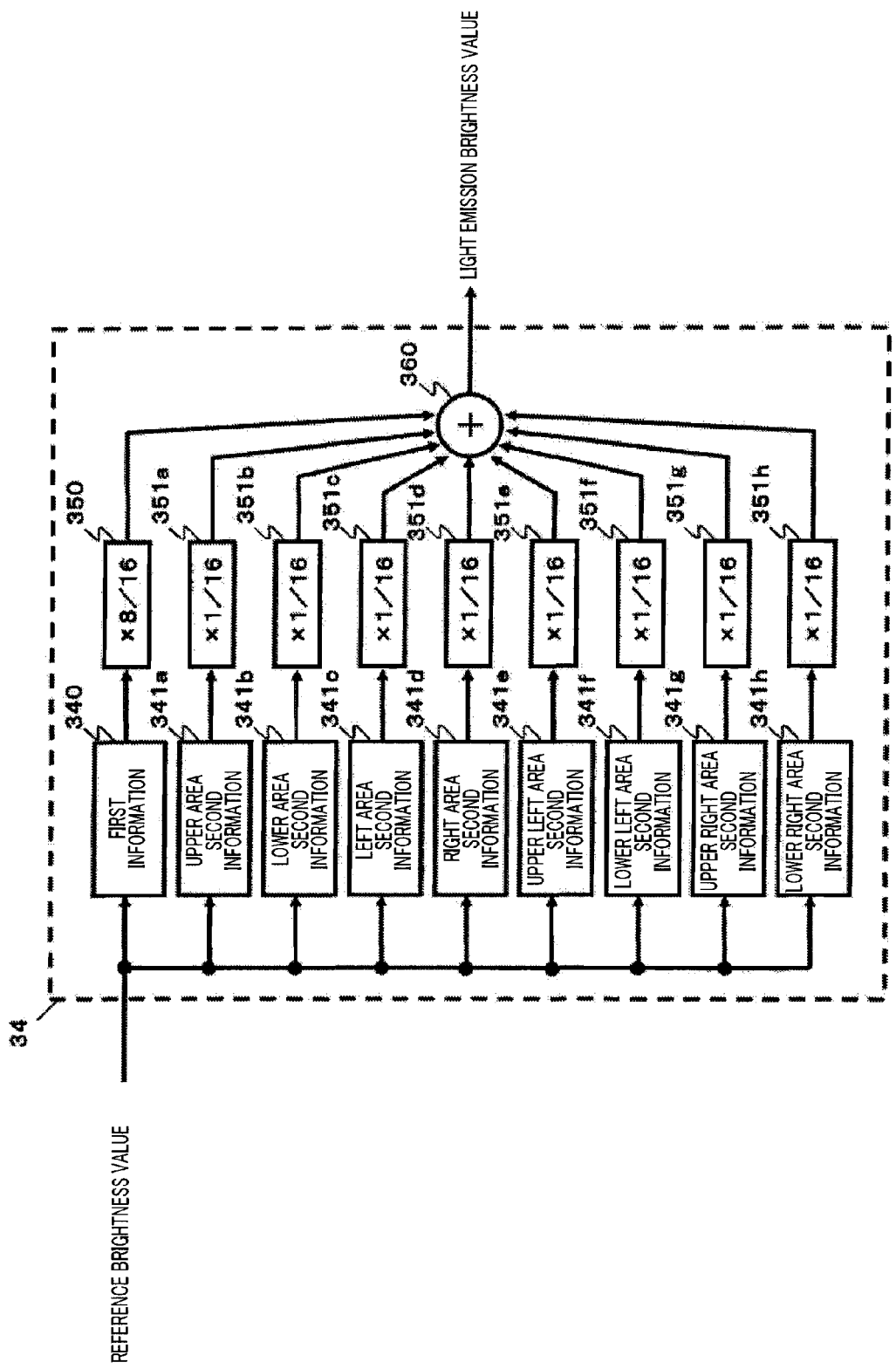
FIG. 7 is a configuration diagram showing a configuration of a weighting section according to Embodiment 1.

FIG. 7 is a configuration diagram showing a more specific configuration of weighting section 34 according to the present embodiment. Weighting section 34 has: first information retrieving block 340; eight second information retrieving blocks 341a, 341b, 341c, 341d, 341e, 341f, 341g and 341h; first information weighting block 350; eight second information weighting blocks 351a, 351b, 351c, 351d, 351e, 351f, 351g and 351h; and adding block 360.

First information retrieving block 340 retrieves the first information from temporary memory 33. First information weighting block 350 applies a weight to the first information retrieved by first information retrieving block 340, and outputs the first weighted brightness value.

Second information retrieving blocks 341a to 341h retrieve the second information of second light emitting areas 2c to 4e from temporary memory 33. Second information weighting blocks 351a to 351h each apply a weight to the second information retrieved from second information retrieving blocks 341a to 341h, and output the second weighted brightness values.

Adding block 360 adds the first weighted brightness value outputted from first information weighting block 350 and the eight second weighted brightness values outputted from second information weighting blocks 351a to 351h.

With the present embodiment, first information weighting block 350 applies an 8/16 weight to the first information. Further, second information weighting blocks 351a to 351h each apply a 1/16 weight equally to all items of the second information. The second information shows the reference brightness value of each one of the eight neighboring light emitting areas surrounding the first light emitting area. Hereinafter, the weight for the first information (i.e. the reference brightness value of the first light emitting area) is referred to as the "first weight," and the weights for the second information (i.e. the reference brightness values of the second light emitting areas) are referred to as "second weights."

Figure 8:
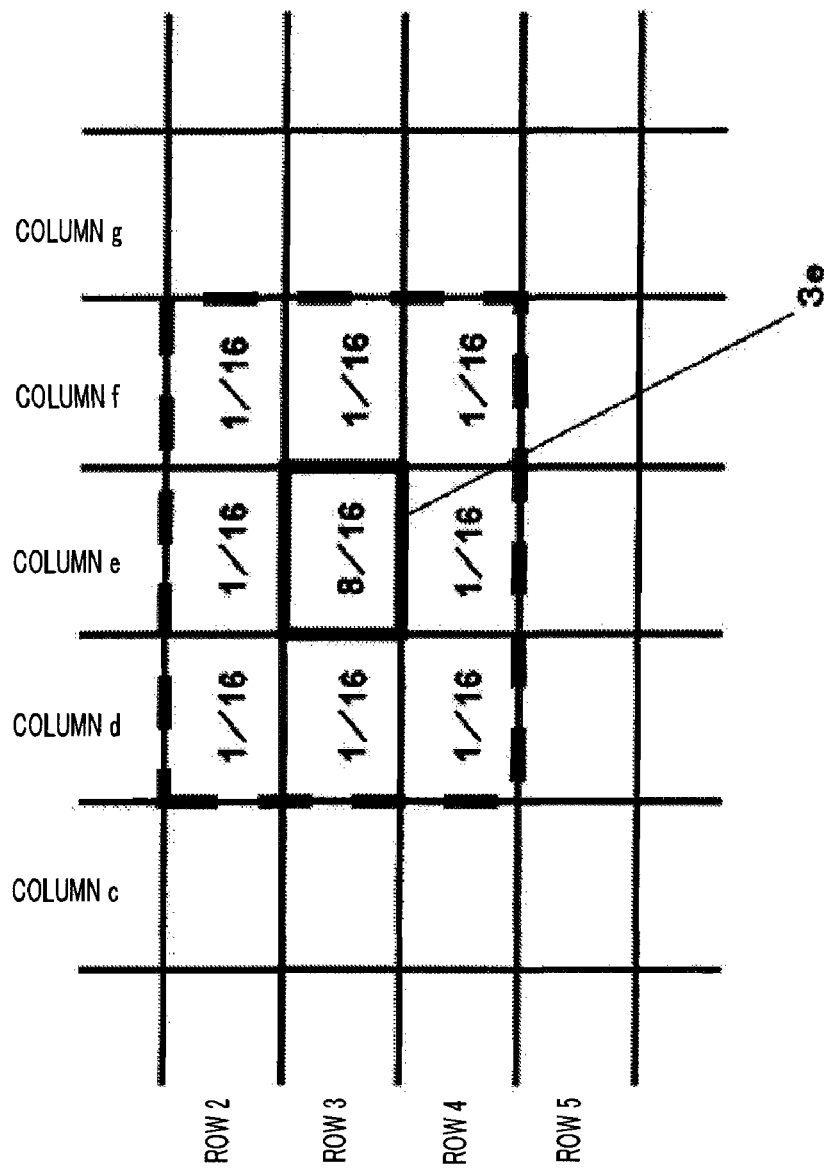
FIG. 8 illustrates the concept of applying weights according to Embodiment 1.

FIG. 8 illustrates the concept of applying weights. FIG. 8 shows part of light emitting section 21 where how a weight is applied to the reference brightness value of each light emitting area is shown in case where the first light emitting area is light emitting area 3e. In this case, the light emitting areas belonging to the surrounding areas of three rows and three columns around light emitting area 3e become the second light emitting areas (i.e. the areas surrounded by broken lines). Here, a case will be explained where the first weight occupies the 8/16 weight and the second weights each occupy the 1/16 weight.

As shown in FIG. 8, in light emitting area 3e, the 8/16 weight is applied to the reference brightness value. Further, in the surrounding second light emitting areas, the 1/16 weight is applied to each reference brightness value. The weights are applied in this way, and therefore the sum of the weights is one, and the ratio of the weight for the reference brightness value of the first light emitting area (i.e. first weight) and the total value of the weights for the reference brightness values of all the second light emitting areas (i.e. the total value of second weights) is 1:1. That is, the first weight occupies 50 percent and the total value of the second weights occupies 50 percent (each second weight occupies 50/8=6.25 percent), which makes the total of the weights 100 percent.

By adding the nine weighted brightness values obtained by applying weights, the final light emission brightness value of light emitting area 3e is calculated.

Here, an example of a method of determining a predetermined ratio of a numerical value for a weight with respect to each light emitting area without changing the sum of the weights, will be explained.

First, assume that the ratio of the first weight and the total value of the second weights is set to M:N. Further, the number of the second light emitting areas is X.

In this condition, the first weight is determined by $M \times X/\{(M+N) \times X\}$.

Further, the total value of the second weights can be determined by $N \times X/\{(M+N) \times X\}$. Here, in case where all of the second weights are made the same value, the second weight is determined by $N/\{(M+N) \times X\}$.

With the present embodiment, M:N=1:1 and X=8 hold.

Consequently, the first weight and each second weight can be determined as the 8/16 weight and 1/16 weight, respectively.

Note that the method of setting weights is not particularly limited to this and other methods are also possible.

With this configuration, when light emission brightness values of light emitting areas are calculated, it is possible to calculate a light emission brightness value reflecting brightness signals of surrounding light emitting areas of that light emitting area.

The determined light emission brightness values of light emitting areas are outputted to LED driver 22 of illuminating section 20 and image signal correcting section 40.

<1-1-4. Image Signal Correcting Section>

Image signal correcting section 40 corrects an image signal inputted to liquid crystal panel 10, based on the light emission brightness values determined in brightness determining section 30.

When brightness control is performed on a per light emitting area basis, even if an image display area receives the same original image signal, images are displayed at varying brightness depending on the case where the light emission brightness value of that light emitting area is determined low and the case where the light emission brightness value of that light emitting area is determined high. Therefore, cases occur where a display image looks unnatural. In order to reduce this unnaturalness, in association with the light emission brightness value of each light emitting area, image signal correcting section 40 corrects an image signal of an image to be displayed. To be more specific, image signal correcting section 40 changes the contrast gain of an image to be displayed on liquid crystal panel 10 according to the degree of change in each light emission brightness value. By this means, image signal correcting section 40 corrects the negative effect accompanying the above-described brightness control per light emitting area.

The configuration of the liquid crystal display apparatus has been explained so far.

<1-2. Operation of Liquid Crystal Display Apparatus>

Next, as to a specific example of the display operation by the liquid crystal display apparatus based on the above configuration, the characteristic operation of the present invention will be mainly explained.

<1-2-1. Calculation of Reference Brightness Values>

Figure 9:
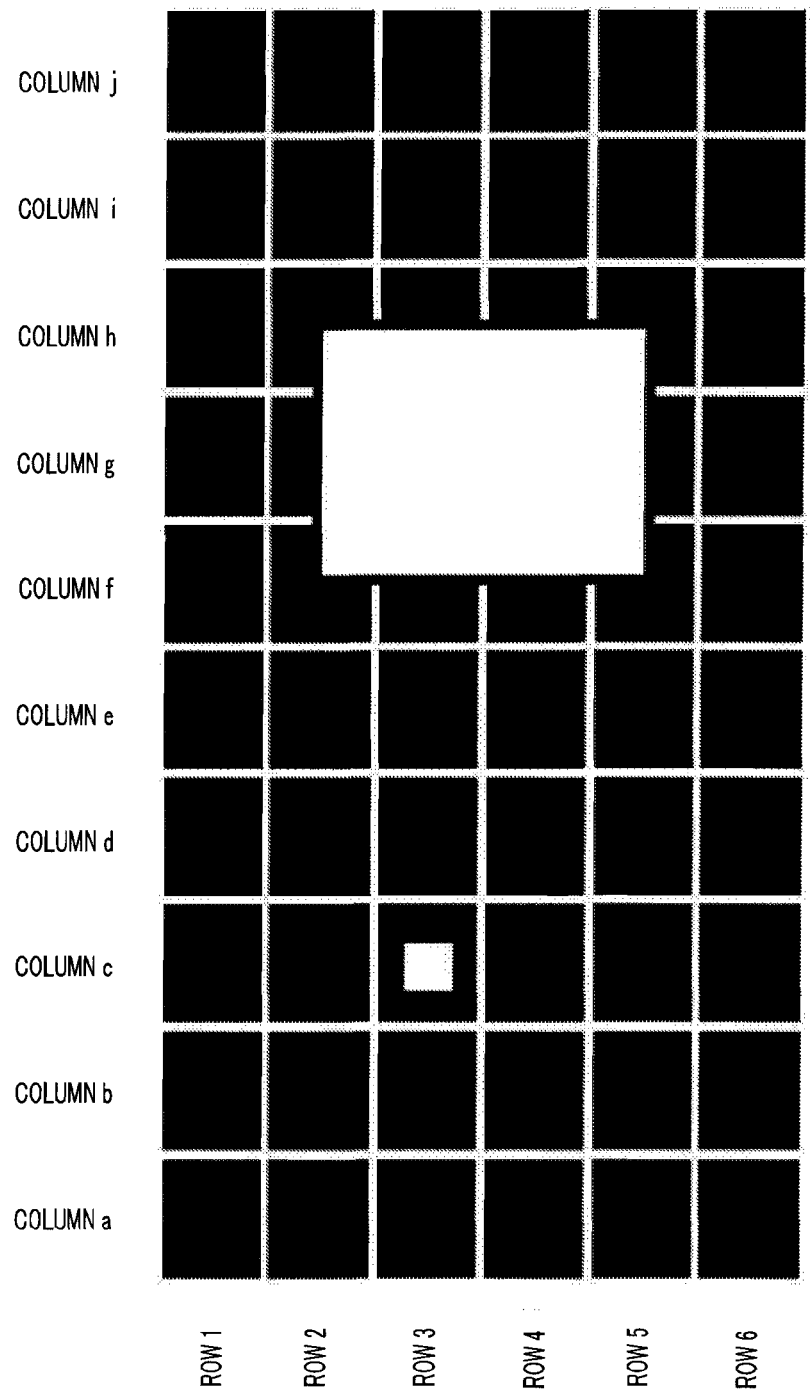
FIG. 9 shows an example of an image inputted to the liquid crystal panel according to Embodiment 1.

FIG. 9 shows an example of an image inputted to liquid crystal panel 10 where two larger and smaller rectangular objects of 100 percent white are placed on a black background. Note that, in FIG. 9, the white grid lines indicate the frames of image display areas of liquid crystal panel 10 (or corresponding light emitting areas of light emitting section 21) and are not included in the actual image.

The image signal of the image shown in FIG. 9 is inputted to feature detecting section 31 in brightness determining section 30, and its average brightness value, which is the feature amount, is detected per image display area. Then, each detected feature amount is inputted to brightness calculating section 32 and is converted into the reference brightness value of each light emitting area.

FIG. 10 shows the reference brightness value of each light emitting area of light emitting section 21, which is calculated in brightness calculating section 32. Note that brightness calculating section 32 used here has the conversion table having the characteristics shown in FIG. 6A. Consequently, the feature amount is converted into the same value as the reference brightness value, and, for example, if the feature amount is 0, the reference brightness value is 0, if the feature amount is 128, the reference brightness value is 128, and, if the feature amount is 255, the reference brightness value is 255.

The numerical values in FIG. 10 will be explained in details using light emitting area 3c as an example. In case of light emitting area 3c, the smaller rectangular object in FIG. 9 is an image of 100 percent white. Therefore, the brightness signal of each pixel included in an image signal showing the object portion has a maximum value of 255. The smaller rectangular object in FIG. 9 occupies the 1/4 area of the image display area associated with light emitting area 3c. That is, in one fourth of the pixels of the corresponding image display area, the brightness signal takes the maximum value of 255. Therefore, an average brightness value of 64 is detected for light emitting area 3c as a feature amount, and a reference brightness value of 64 is determined.

Likewise, a pattern of the larger rectangular in FIG. 9 will be explained. In all pixels of image display areas matching light emitting area 3g and light emitting area 4g, the brightness signals have the values of 255. Therefore, for light emitting areas 3g and 4g, feature amount 255 is detected and the reference brightness value 255 is determined.

In half of pixels of image display areas matching light emitting area 2g, 3f, 3h, 4f, 4h and 5g, the brightness signals have the values of 255. Therefore, for these light emitting areas, feature amount 128, which is half of the brightness signals, is detected, and the reference brightness value 128 is detected.

In the one fourth of pixels of image display areas matching light emitting area 2f, 2h, 5f and 5h meeting the four corners of the rectangular pattern, the brightness signals have values of 255. Therefore, for these light emitting areas, feature amount 64, which is one fourth of the brightness signals, is detected, and the reference brightness value 64 is determined.

<1-2-2. Calculation of Light Emission Brightness Values by Applying Weights>

Next, the operation of weighting section 34 with respect to calculated reference brightness values will be explained.

Here, to clarify the function of the present invention, a case where weighting section 34 is not used will be explained first for comparison.

Figure 11:
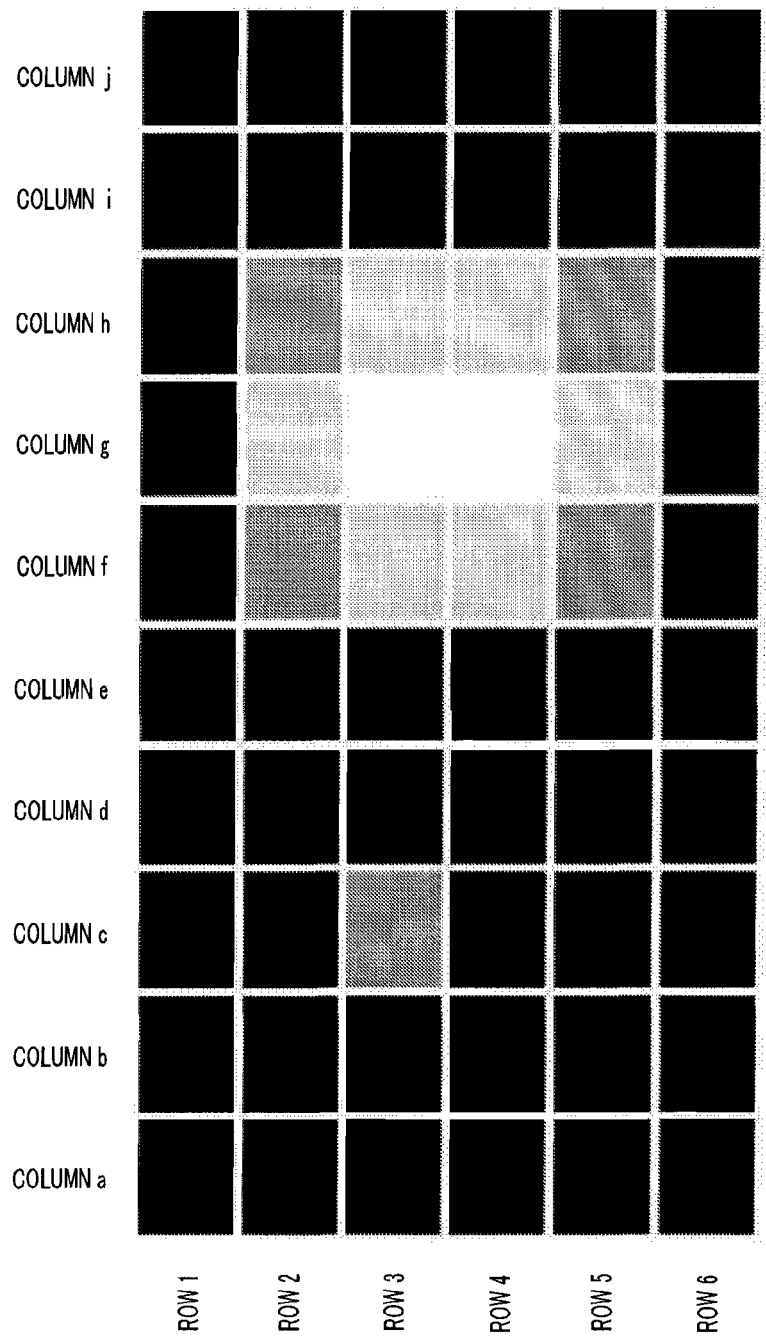
FIG. 11 shows the state of light emission when a weighting section is not used according to Embodiment 1.

FIG. 11 shows the light emitting state of light emitting section 21 in case where the reference brightness values shown in FIG. 10 are inputted to illuminating section 20 as is without passing through weighting section 34. Further, FIG. 12 shows an image that is actually displayed on liquid crystal panel 10 when light in FIG. 11 illuminates liquid crystal panel 10 from its back.

Figure 12:
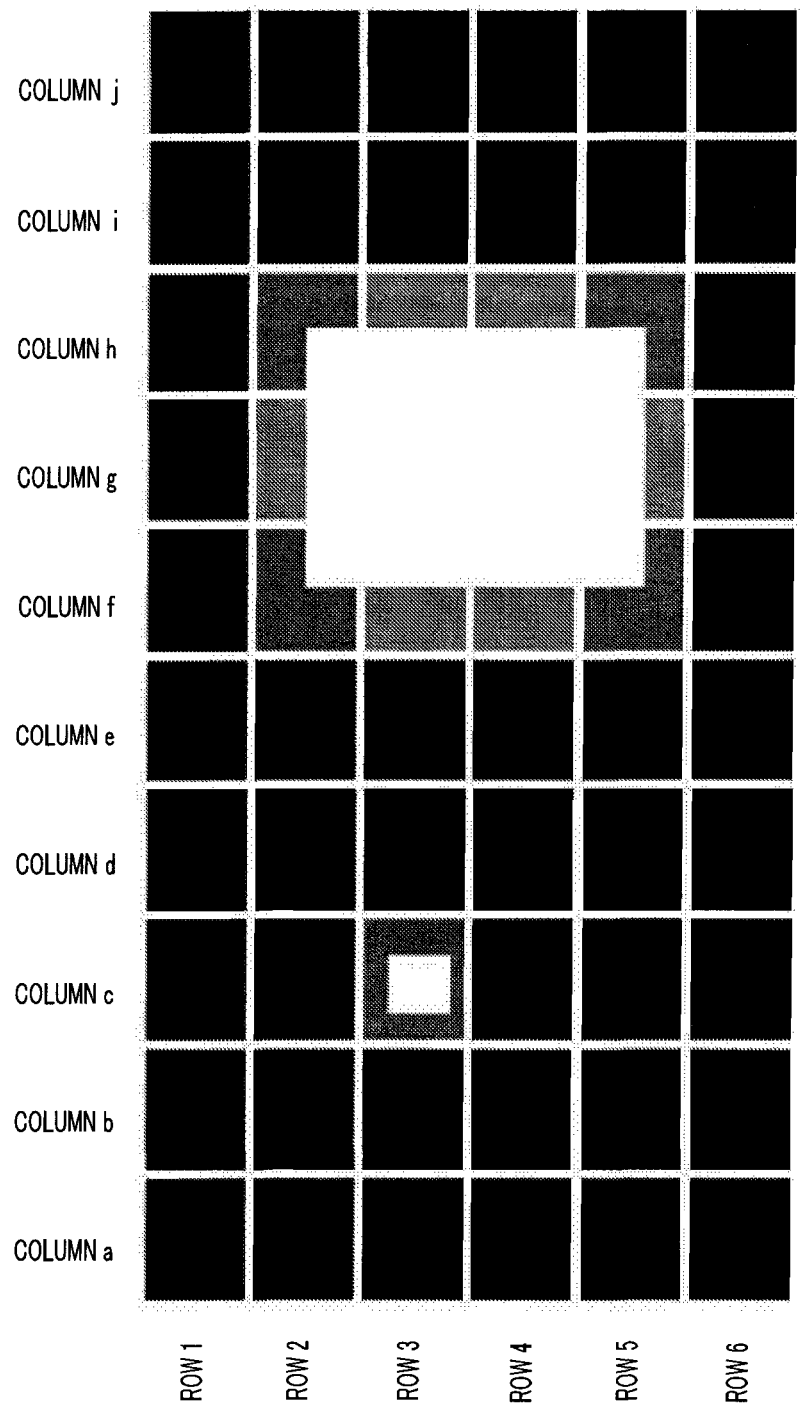
FIG. 12 shows an image that is actually displayed on a liquid crystal panel according to Embodiment 1.

As shown in FIG. 12, upon comparison of a light emitting area (for example, light emitting area 1g) that is not emitting light and light emitting area 2g that is emitting light, the black part in image display area 2g associated with light emitting area 3c stands out brightly. That is, image display area 3c' shows an undesirable display in which "black floating" is seen. This results from the difference between light emission brightness values of light emitting areas that are not emitting light and light emitting areas that are emitting light. Note that, unlike the black part, the white part has uniform brightness because brightness signals are corrected by image signal correcting section 40.

Next, a case where weighting section 34 is used will be explained.

FIG. 13 shows weighted brightness values outputted from weighting section 34. The calculation of numerical values in FIG. 13 will be explained in details using FIG. 14.

Figure 14:
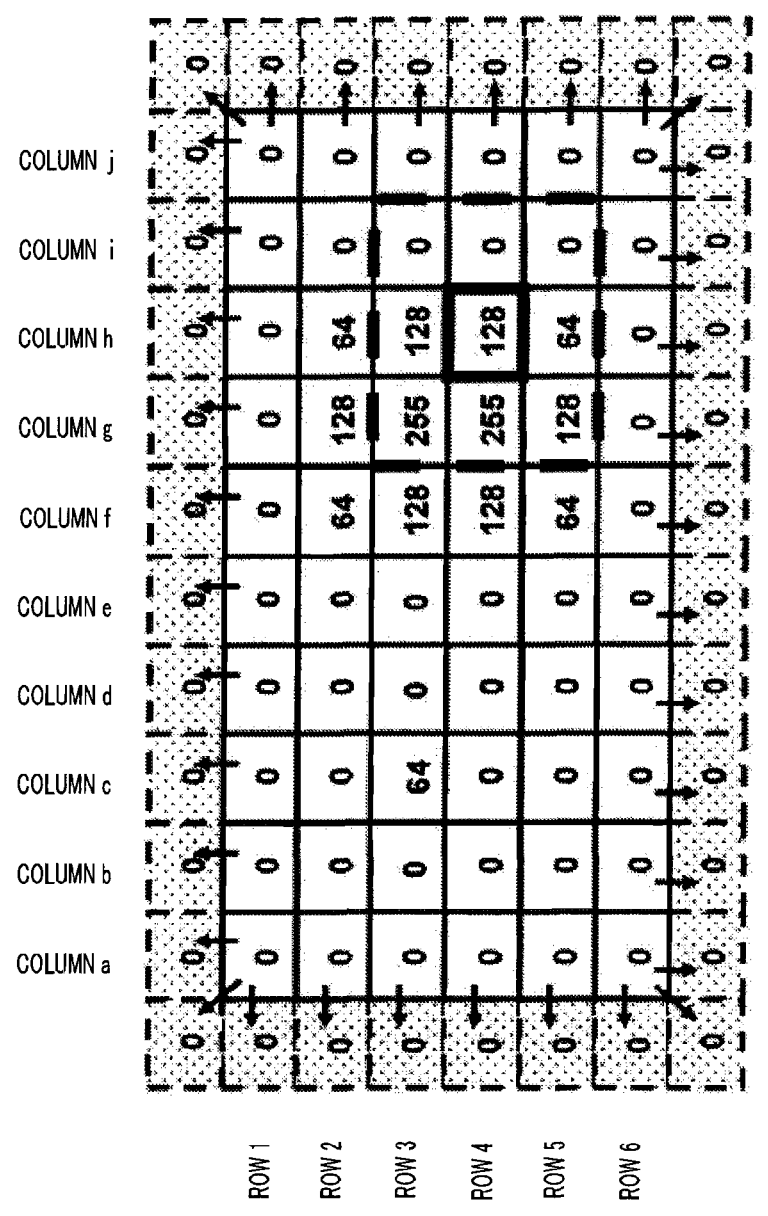

FIG. 14 illustrates calculation of numerical values of reference brightness values before the reference brightness values are inputted to weighting section 34. For example, in case of light emitting area 4h, the reference brightness value corresponding to the first information is 128 as shown in FIG. 14. The second information of light emitting area 4h includes each reference brightness value of eight surrounding light emitting areas 3g, 3h, 3i, 4g, 4i, 5g, 5h and 5i.

Here, as explained in the above configuration, first information weighting block 350 applies the 8/16 weight to the first information. That is, the value of 128×(8/16) is derived from light emitting area 4h as the first weighted brightness value.

Second information weighting blocks 351a to 351h each apply the 1/16 weight to the second information. That is, the values of 255×(1/16) are derived from light emitting areas 3g and 4g, the values of 128×(1/16) are derived from light emitting areas 3h and 5g, the value of 64×(1/16) is derived from light emitting area 5h and the values of 0×(1/16) are derived from light emitting areas 3i, 4i and 5i as second weighted brightness values.

Then, a sum of 115.9 is calculated by adding these nine weighted brightness values, as the light emission brightness value of light emitting area 4h.

By calculating the light emission brightness values of all light emitting areas according to the same method, the light emission brightness values shown in FIG. 13 are acquired.

Note that there are no light emitting areas in one of eight surrounding directions of the light emitting areas at the end parts of light emitting section 21 (the light emitting areas belonging to row 1, row 6, column a and column j). Therefore, as shown in FIG. 14, weighting section 34 calculates the light emission brightness values of these light emitting areas at the end parts by using virtual light emitting areas that extend in the row direction and in the column direction to assume that there are light emitting areas in eight surrounding directions of all light emitting areas.

That is, weighting section 34 adds one row of virtual light emitting areas having the same reference brightness value as row 1, to the upper side of row 1, and adds one row of virtual light emitting areas having the same reference brightness value as row 6, to the lower side of row 6. Then, weighting section 34 adds one column of virtual light emitting areas having the same reference brightness value as row a, to the left side of column a, and adds one column of virtual light emitting areas having the same reference brightness values as column j, to the right side of column j. Further, weighting section 34 extends the light emitting areas at the four corners of light emitting section 21 to use as light emitting areas meeting the four corners of the extended virtual area.

Figure 15:
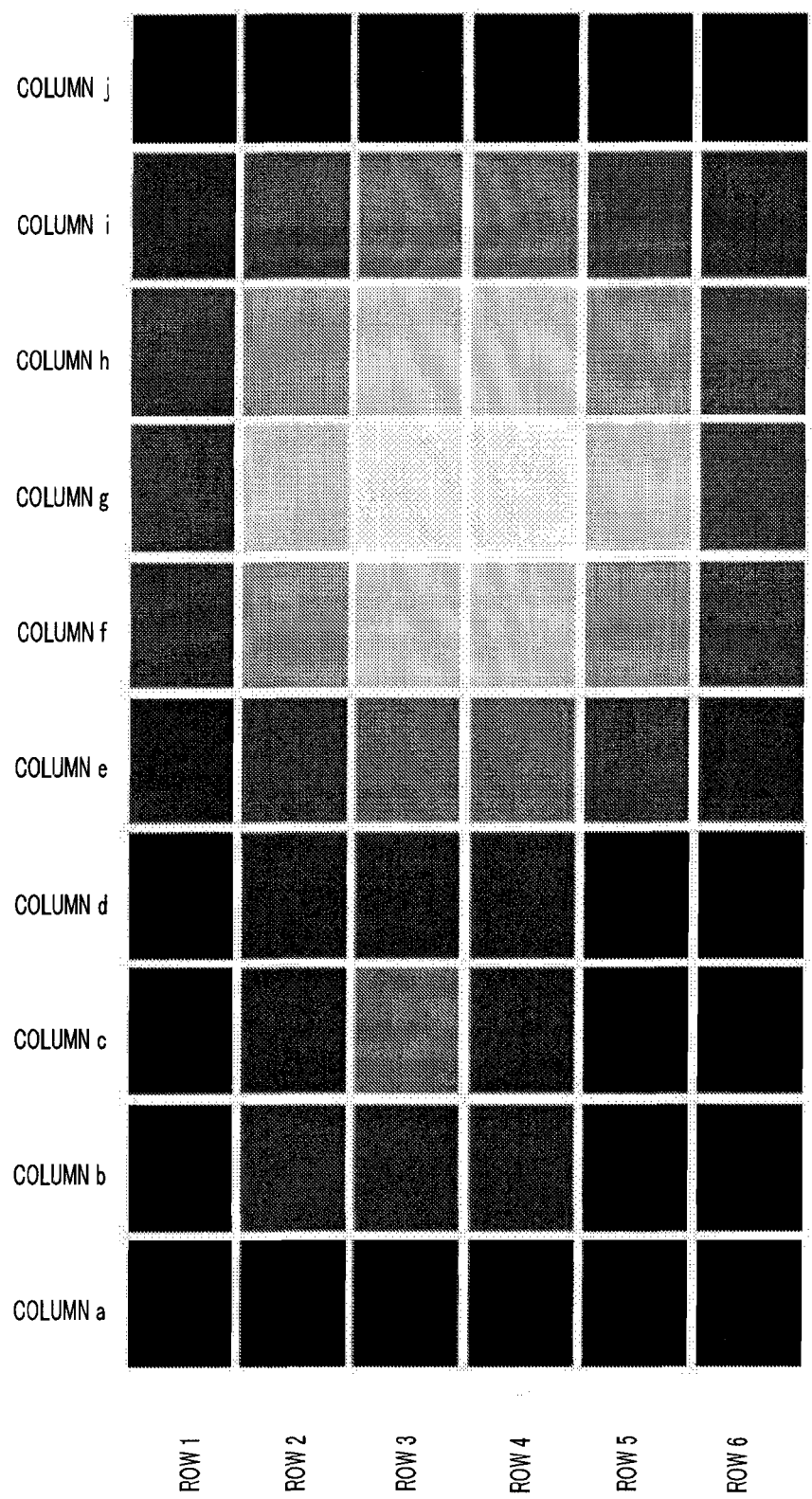
FIG. 15 shows the state of light emission when the weighting section is used according to Embodiment 1.

FIG. 15 shows the light emitting state of illuminating section 21 in case where the light emission brightness values shown in FIG. 13 are inputted in illuminating section 20. Further, FIG. 16 shows an image that is actually displayed on liquid crystal panel 10 when light in FIG. 15 illuminates liquid crystal panel 10 from its back.

Figure 16:
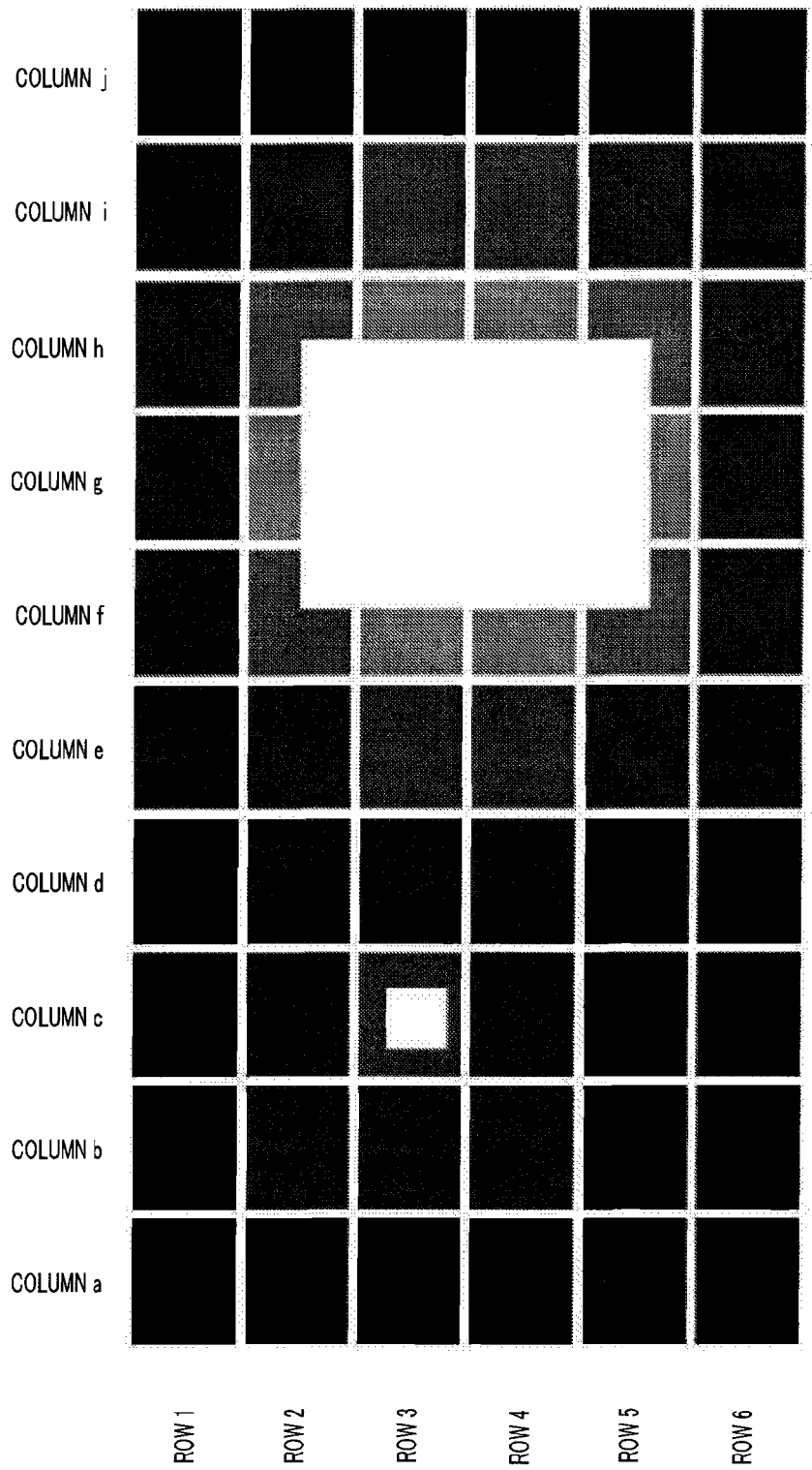
FIG. 16 shows an image that is actually displayed on the liquid crystal panel according to Embodiment 1.

As shown in FIG. 16, in case where weighting section 34 is used, the difference in light emission brightness values is alleviated between the light emitting areas that are not emitting light and light emitting area that is emitting light compared to FIG. 12 showing a case where weighting section 34 is not used. By this means, "black floating" is alleviated.

The operation of the liquid crystal display apparatus has been explained.

<Summary of Characteristics>

Next, a characteristic advantage of the liquid crystal display apparatus according to the present embodiment illustrated.

For example, in case where light emitting areas of high brightness values and light emitting areas of low brightness values (particularly, light emitting areas having brightness values close to 0) adjoin each other in an input image signal, a conventional liquid crystal display apparatus decides whether to correct the light emission brightness values of light emitting areas having low brightness values by comparing the difference in brightness with a threshold. Therefore, as described above, there is a possibility that brightness becomes discontinuous in time.

The liquid crystal display apparatus according to the present embodiment does not use such a threshold, and therefore brightness does not become discontinuous.

Further, in case where light emitting areas of high brightness values and light emitting areas of low brightness values (particularly, light emitting areas of brightness values close to 0) adjoin each other in an input image signal, a conventional liquid crystal display apparatus corrects only the brightness values of light emitting areas of low brightness values to increase, without correcting brightness values of light emitting areas of high brightness values.

By contrast with this, the liquid crystal display apparatus according to the present embodiment functions to decrease light emission brightness values of light emitting areas of high average brightness values and increase light emission brightness values of light emitting areas of low average brightness values. With this function, it is possible to reduce the increase in power due to brightness value correction compared to conventional configurations.

With the present embodiment in particular, the sum of weights for light emitting areas by the weighting section becomes one. Consequently, it is possible to apply weights in a state where the change in the amount of light emitted from the illuminating section is suppressed, and reduce extra power consumption.

With the present embodiment, an average brightness value is used as a feature amount. In case where the average brightness value is used as the feature amount, brightness of the light emitting area of a smaller white object becomes lower than that of the light emitting area of a larger white object. Accordingly, in case where image signals are not corrected by the image signal correcting section, compared to the larger white object, the smaller white object has low brightness of an image that transmits through a liquid crystal panel and is displayed.

However, the characteristics of human eyes generally tend to sense that a smaller white area is brighter than a larger white area when brightness is the same. Therefore, using an average brightness value as a feature amount also results in a display of little unnaturalness. It is naturally possible to correct image signals in the image signal correcting section, such that the difference in brightness between the larger white and the smaller white becomes small.

Further, the liquid crystal display apparatus according to the present embodiment can acquire the same advantage even when a peak value of a brightness signal (hereinafter "peak brightness value") in each pixel, which is included in the input image signal of each image display area, is used as a feature amount. With a conventional configuration, if peak brightness values alone are used, it is not possible to change brightness values according to the areas as described above. According to the present embodiment, brightness signals of surrounding light emitting areas are taken into account, so that, even when the peak brightness values are used as feature amounts, it is possible to change brightness values according to areas. This will be described later.

Further, an average brightness value and peak brightness value may be used in combination as a feature amount. Furthermore, according to an input image signal of each image display area, it is also possible to change weights for the average brightness value and peak brightness value when these average brightness value and peak brightness value are added. The advantages of these configurations will be explained using FIG. 17 and FIG. 18.

Figure 17:
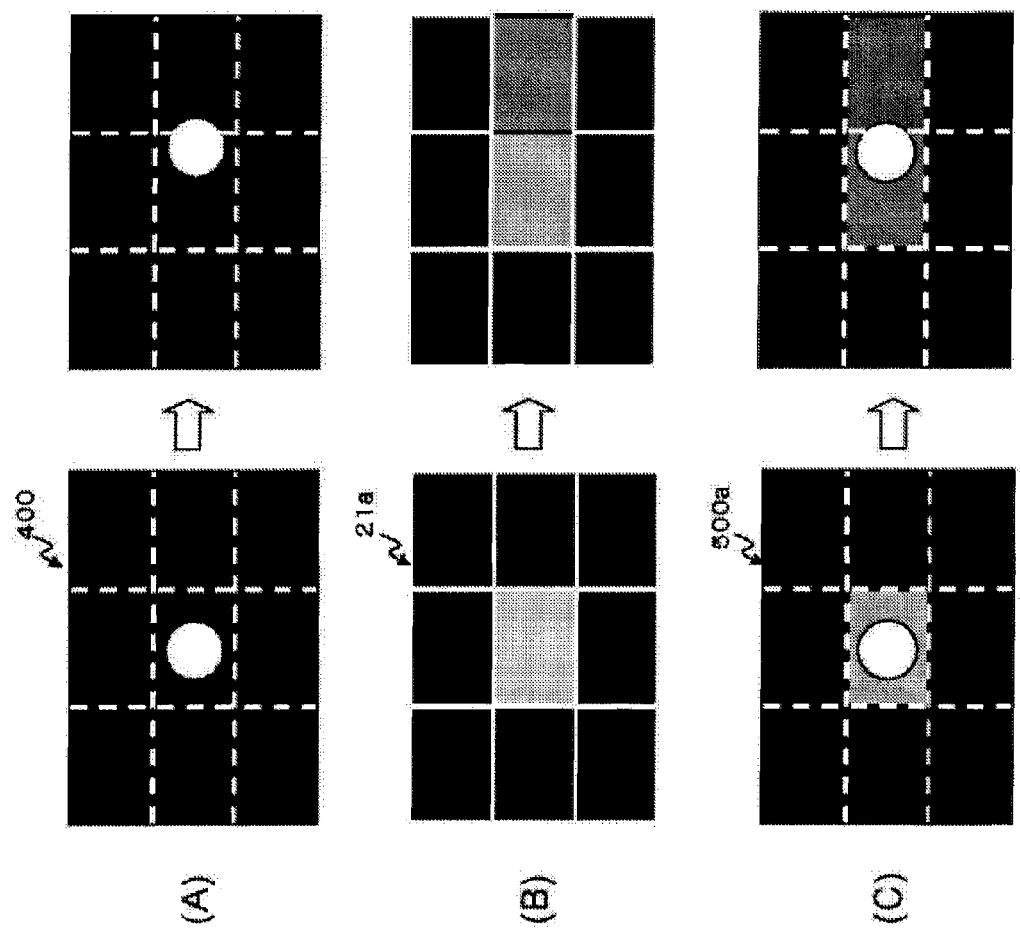
FIG. 17 illustrates an aspect in case where average brightness values are used as feature amounts according to Embodiment 1.

FIG. 17 illustrates the characteristics in case where an average brightness value is used as a feature amount. FIG. 17A shows input image 400. In input image 400, there is a circular object with a high peak brightness on a black background. Note that the broken lines on input image 400 indicate the positions of divided areas of the backlight for ease of understanding, and are not included in the input image. FIG. 17B shows the light emitting state of light emitting section 21*a*, which is part of light emitting section 21, in case where an average brightness value is used as a feature amount. Here, the area located in the center of light emitting section 21*a* includes a circular object with a high peak brightness of input image 400, and emits light at brightness matching the image of that area. Then, surrounding areas are turned off because the overall images of these areas are black. FIG. 17C shows display image 500*a* displayed in part of liquid crystal panel 10 in case where an average brightness value is used as a feature amount.

Figure 18:
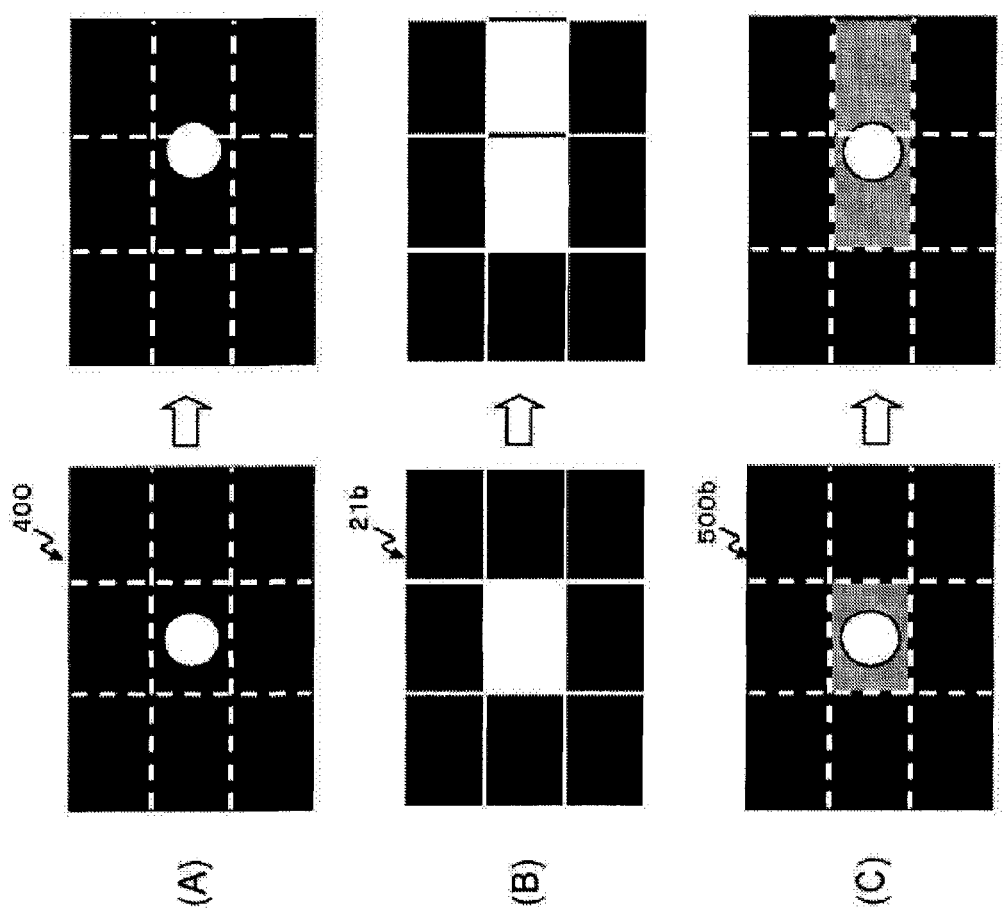
FIG. 18 illustrates an aspect in case where peak brightness values are used as feature amounts according to Embodiment 1.

FIG. 18 illustrates the characteristics in case where a peak brightness value is used as a feature amount. FIG. 18A shows same input image 400 as in FIG. 17A. FIG. 18B shows the light emitting state of light emitting section 21*b*, which is part of light emitting section 21, in case where a peak brightness value is used as a feature amount. Here, the area located in the center of light emitting section 21*b* includes a circular object with a high peak brightness of input image 400, and emits light at brightness according to the image of that area. Then, surrounding areas are turned off because the overall images of these areas are black. FIG. 18C shows display image 500*b* displayed in part of liquid crystal panel 10 in case where a peak brightness value is used as a feature amount.

As shown in FIG. 17C, in case where an average brightness value is used as a feature amount, even when the object in the image moves, brightness of each light emitting area does not change steeply, and, consequently, a display of little unnaturalness is possible. However, cases may occur where, in an image display area having a low average brightness value, the peak brightness of a very small white light spot of a high brightness value is insufficient (for example, an object like a star in the night sky).

By contrast with this, as shown in FIG. 18C, in case where peak brightness values are used as feature amounts, it is possible to maintain a peak brightness for an object like a star in the night sky. However, cases occur where, when an object in an image moves, the brightness of each light emitting area changes steeply and a display becomes unnatural.

The following advantage is provided by utilizing these characteristics to combine an average brightness value and peak brightness value as a feature amount or to change the weights for these average brightness value and peak brightness value according to an input image signal of each image display area. That is, it is possible to prevent peak brightness values from being locally insufficient according to an image to be displayed and prevent light from being emitted in an unnatural fashion according to the motion of the image, and, consequently, it is possible to adequately adjust the amount of light emitted from light emitting areas based on the optimal feature amounts.

Further, although LEDs are used as light sources with the present embodiment, the present invention is not limited to this. For example, laser light sources and fluorescent tubes may be used as light sources. That is to say, the light source only needs to control light emission brightness of divided light emitting areas. In case where a laser light source is used, it is possible to make an area for color reproduction wider. In case where fluorescent tubes are used, it is possible to make a liquid crystal panel thinner compared to the case where LEDs are aligned.

Figure 19:
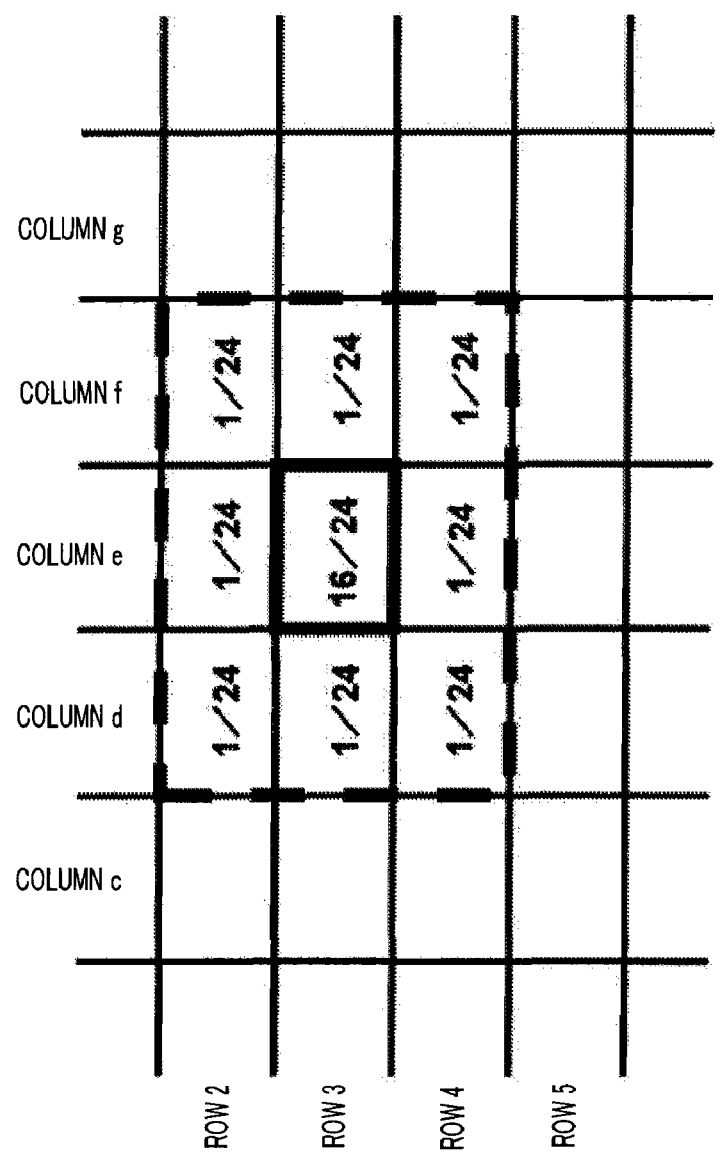

Further, although, with the present embodiment, the weighting section applies the 8/16 weight to the reference brightness value of the first light emitting area and applies the 1/16 weight to the reference bright values of the second light emitting areas, the present invention is not limited to this. In case where it is necessary to increase the first weight and decrease second weights, weights may be set as shown in, for example, FIG. 19. FIG. 19 illustrates weights in case of M:N=2:1.

By contrast with this, in case where it is necessary to decrease the first weight and increase second weights, the weighting section only needs to apply weights as shown in, for example, FIG. 20. FIG. 20 illustrates the first weight and the second weights in case of M:N=1:2.

These weights may be changed according to an input image signal of each image display area. The specific numerical values of weights other than the above may be possible. Further, in case where the overall brightness needs to be increased, the first weight and the second weights may be determined such that the sum of the weights becomes one or more. By contrast with this, in case where the overall brightness needs to be decreased, the first weight and the second weights may be determined such that the sum of the weights becomes one or less.

Figure 21:
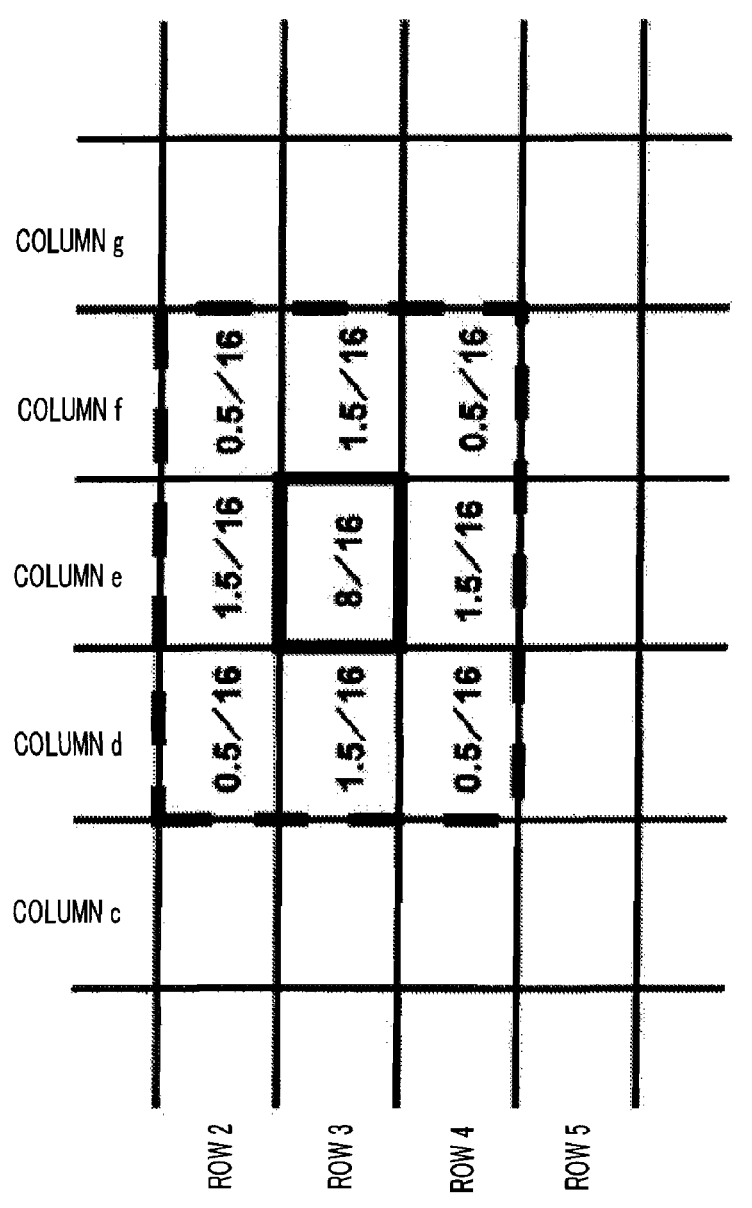

Further, although, with the present embodiment, the weighting section makes all second weights the same, the present invention is not limited to this. As shown in FIG. 21, for example, the weighting section may make the second weights for the second light emitting areas (i.e. light emitting areas 2*d*, 2*f,* 4*d* and 4*f*) located diagonally with respect to the first light emitting area (i.e. light emitting area 3*e*), lower than the second weights for the other second light emitting areas. That is, the weighting section may change weights per second light emitting area.

The substantial distance between the first light emitting area and second light emitting areas located diagonally is a little longer than the other second light emitting areas. Consequently, by decreasing weights for the reference brightness values of the second light emitting areas located diagonally, an image display is possible with less unnaturalness.

Further, although, with the present embodiment, the weighting section applies weights to the reference brightness values of light emitting areas of three rows and three columns assuming that the eight surrounding areas around the first light emitting area are second light emitting areas, the present invention is not limited to this. The weighting section may change the number of light emitting areas such as five rows and five columns or five rows and three columns that are assigned weights. In this case, by providing an odd number of rows and an odd number of columns, it is possible to place second light emitting areas symmetrically with respect to the first light emitting area in the row direction and in the column direction.

FIG. 22 illustrates a case where the reference brightness values of light emitting areas of five rows and five columns that are assigned weights. At this time, the weighting section applies lower weights to reference brightness values of second light emitting areas located farther away from the first light emitting area. By so doing, an image display is possible with less unnaturalness.

Further, although, with the present embodiment, the second light emitting areas are eight surrounding areas around the first light emitting area, the present invention is not limited to this. For example, weights may be applied by assuming that all light emitting areas including the first light emitting area as the second light emitting areas and using an average value of brightness signals of the entire screen as second information.

By so doing, it is possible to change brightness of each light emitting area according to an average value of brightness signals of the entire screen. Consequently, it is possible to display, for example, an image close to all-white display that increases power consumption of the backlight apparatus, at the reduced light emission brightness while saving power. Further, in an image in which there are some very small white light spots from place to place on a black background that decreases power consumption of the backlight apparatus, it is possible to display the white portions brightly by concentrating power only on the areas with white light spots. In this way, liquid crystal display apparatus 1 can provide expressive images by making all the light emitting areas second light emitting areas.

Further, although, with the present embodiment, liquid crystal display apparatus 1 calculates light emission brightness values using virtual extended light emitting areas for light emitting areas at the end parts in light emitting section 21 and assuming that there are light emitting areas in eight surrounding directions of all light emitting areas, other calculation methods may be used. For example, without using all of the eight surrounding directions, the weighting section may apply weights only to the reference brightness values of the second light emitting areas that are present. Further, liquid crystal display apparatus 1 may not use the weighting section for the light emitting areas at the end parts.

Further, although, with the present embodiment, the weighting section applies certain weights, these weights may be changed by some factors. For example, the weighting section may change weights based on the difference between the first information and second information. When the difference between the first information and the second information is greater, "black floating" is more likely to be seen. Consequently, when the difference between the first information and the second information is greater, it is possible to prevent "black floating" from being seen by increasing the second weights.

Further, although liquid crystal display apparatus 1 has image signal correcting section 40 with the present embodiment, a configuration without image signal correcting section 40 is equally possible. With the configuration without image signal correcting section 40, liquid crystal display apparatus 1 allows brightness control with minimum image quality deterioration compared to conventional liquid crystal display apparatuses. As described above, the further advantage of providing image signal correcting section 40 makes it possible to solve the problem accompanying brightness control performed on a per light emitting area basis.

Embodiment 2

Next, Embodiment 2 (an embodiment of applying weights to reference feature amounts), which is an example where the present invention is applied to a liquid crystal display apparatus, will be explained with reference to the accompanying drawings. Embodiment 2 differs from Embodiment 1 in the configuration of brightness determining section 30 shown in FIG. 3. The configurations of the rest of the parts are the same as in Embodiment 1, and part of explanation will be omitted.

Note that, while reference brightness values calculated in the brightness calculating section are applied weights with Embodiment 1, feature amounts of an image signal prior to being inputted in the brightness calculating section are applied weights with Embodiment 2.

Figure 23:
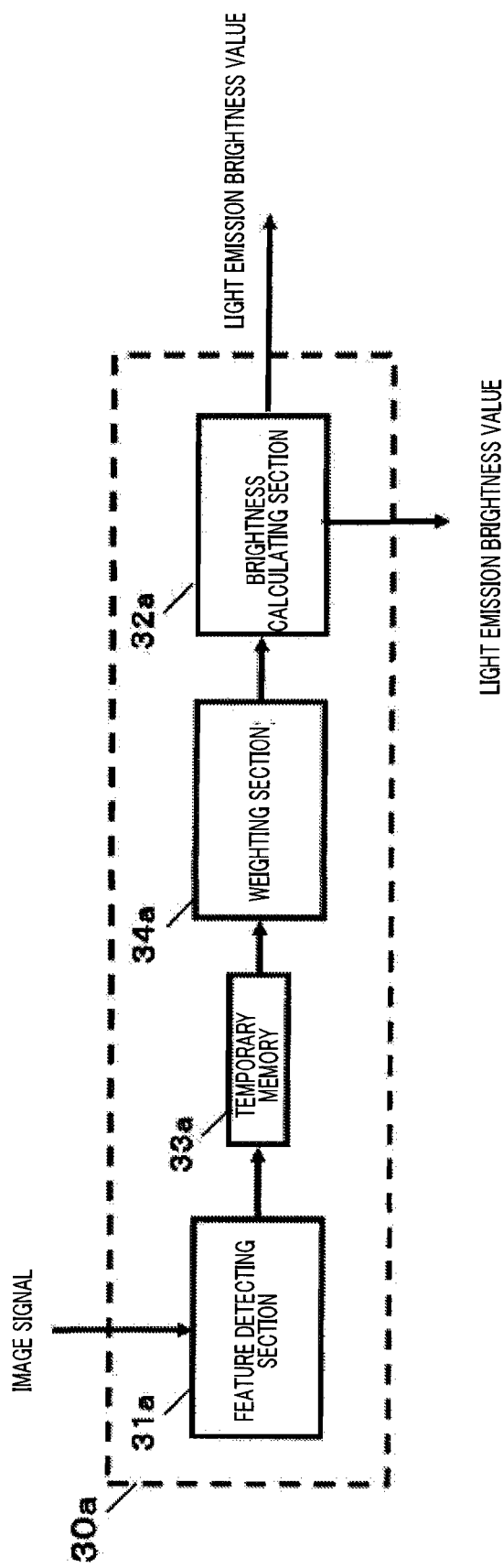
FIG. 23 is a configuration diagram showing a configuration of a brightness determining section according to Embodiment 2.

FIG. 23 is a configuration diagram showing the specific configuration of brightness determining section 30*a*. Roughly, brightness determining section 30*a* has feature detecting section 31*a*, temporary memory 33*a*, weighting section 34*a* and brightness calculating section 32*a*.

Feature detecting section 31*a* has the same function as feature detecting section 31 in Embodiment 1. That is, feature detecting section 31*a* detects the average brightness value per image display area. Feature detecting section 31*a* outputs the detected average brightness value of each image display area, sequentially, to temporary memory 33*a* as the reference feature amount. The "reference feature amount" is a value which serves as a reference when feature amounts of an image signal in each image display area are calculated.

Temporary memory 33*a* stores the reference feature amount outputted from feature detecting section 31*a*. That is, temporary memory 33*a* sequentially stores the reference feature amount per image display area, and stores the reference feature amounts of all image display areas on a temporary basis.

Weighting section 34*a* determines the feature amount of the first image display area, from the values acquired by applying weights to the first information (i.e. the reference feature amount of the first image display area) and the second information (i.e. reference feature amounts of the second image display areas). That is, to determine the feature amount of one image display area (i.e. the first image display area), weighting section 34*a* retrieves from temporary memory 33*a* the reference feature amount (i.e. the first information) for that image display area. Further, weighting section 34*a* retrieves from temporary memory 33*a* the reference feature amounts (i.e. the second information) of predetermined image display areas (i.e. second image display areas) different from that image display area. Then, weighting section 34a applies weights to a plurality of retrieved reference feature amounts (i.e. the first information and second information) and adds the results to determine the feature amount of that image display area (i.e. the first image display area).

With the present embodiment, the second image display areas refer to the eight neighboring image display areas surrounding the first image display area. For example, to illustrate using FIG. 4, in case where image display area 3d is the first image display area, the second image display areas are image display areas 2c, 2d, 2e, 3c, 3e, 4c, 4d and 4e.

Figure 24:
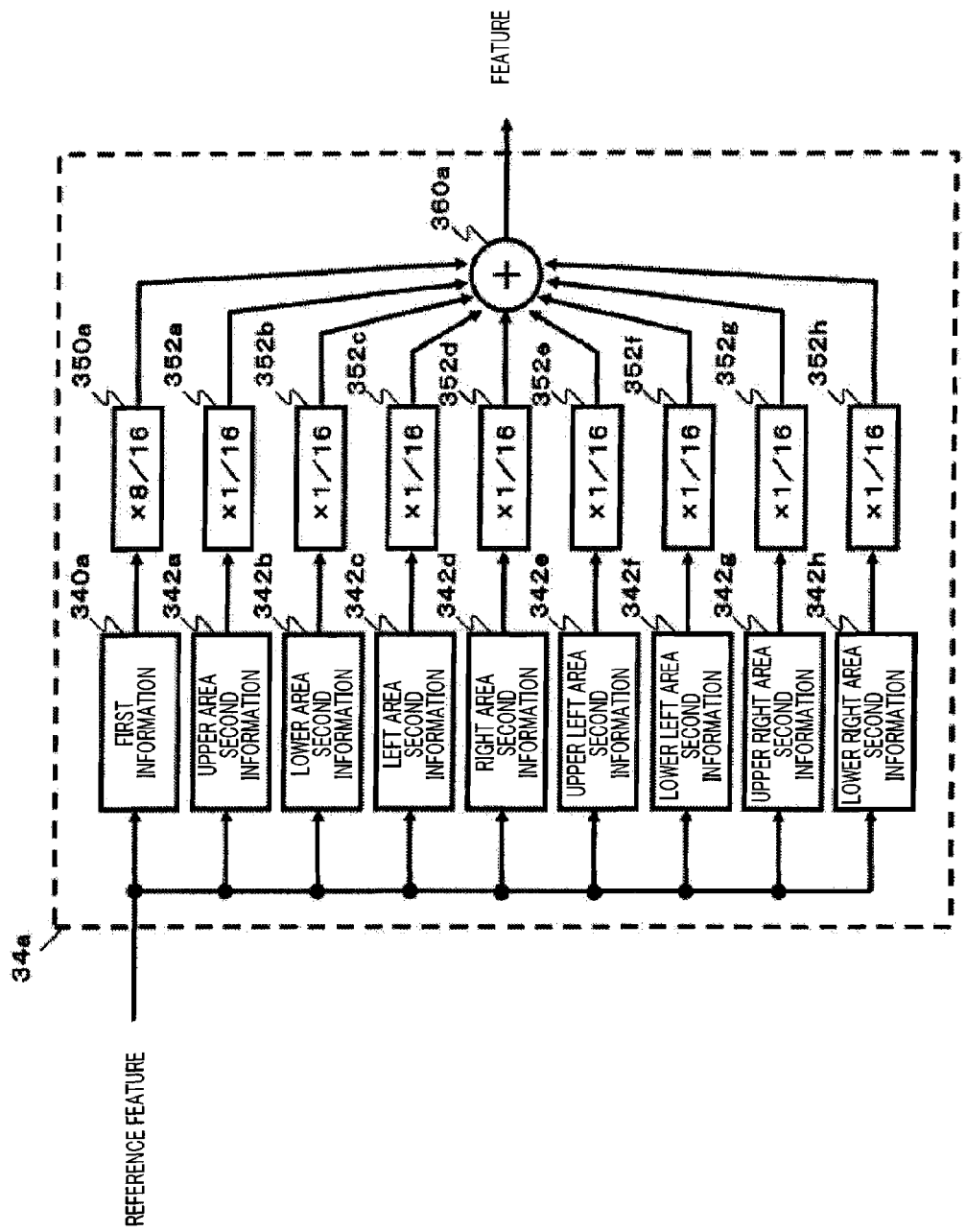
FIG. 24 is a configuration diagram showing an example of a configuration of a weighting section according to Embodiment 2.

FIG. 24 is a configuration diagram showing a more specific configuration of weighting section 34a according to the present embodiment. Weighting section 34a has first information retrieving block 340a, eight second information retrieving blocks 342a, 342b, 342c, 342d, 342e, 342f, 342g and 342h, first information weighting block 350a, eight second information weighting blocks 352a, 352b, 352c, 352d, 352e, 352f, 352g and 352h, and adding block 360a.

First information retrieving block 340a retrieves the first information from temporary memory 33a. First information weighting block 350a applies a weight to the retrieved first information and outputs the first reference feature amount.

Second information retrieving blocks 342a to 342h each retrieve second information from temporary memory 33a. Second information weighting blocks 352a to 352h each apply a weight to the retrieved second information and output a second reference feature amount.

Adding block 360a adds the first reference feature amount outputted from first information weighting block 350a and the second reference feature amounts outputted from second information weighting blocks 352a to 352h.

With the present embodiment, first information weighting block 350a applies the 8/16 weight to the first information. Further, second information weighting blocks 352a to 352h each apply the 1/16 weight equally to all items of the second information. The second information is the reference feature amount of one of eight neighboring image display areas surrounding the first image display area.

The weighting method is the same as the weighting method explained in FIG. 8 of Embodiment 1. That is, according to the weighting method of the present embodiment, light emitting areas are replaced with image display areas in the weighting method explained using FIG. 8.

Weighting section 34a applies a weight to the reference feature amount of each image display area, and outputs the value (i.e. feature amount) to which a weight is applied, to brightness calculating section 32a.

Brightness calculating section 32a calculates the light emission brightness value per light emitting area, based on the input feature amount. That is, per image display area, brightness calculating section 32a converts the feature amount into the light emission brightness value of a light emitting area associated with an applicable image display area, and outputs the light emission brightness value to LED driver 22 of illuminating section 20 and image signal correcting section 40 The conversion tables provided in the brightness calculating section are the same as in brightness calculating section 32 of Embodiment 1, and therefore explanation thereof will be omitted.

With this configuration, although there is a difference as to whether to apply a weight to the feature amount of an image signal of each image display area or to apply a weight to the light emission brightness value of each light emitting area associated with each image display area, it is possible to acquire the same advantage as in Embodiment 1 as a result. That is, in case where an image signal of an image shown in FIG. 9 is inputted, the light emission brightness values of the light emitting areas shown in FIG. 13 are determined.

Figure 25:
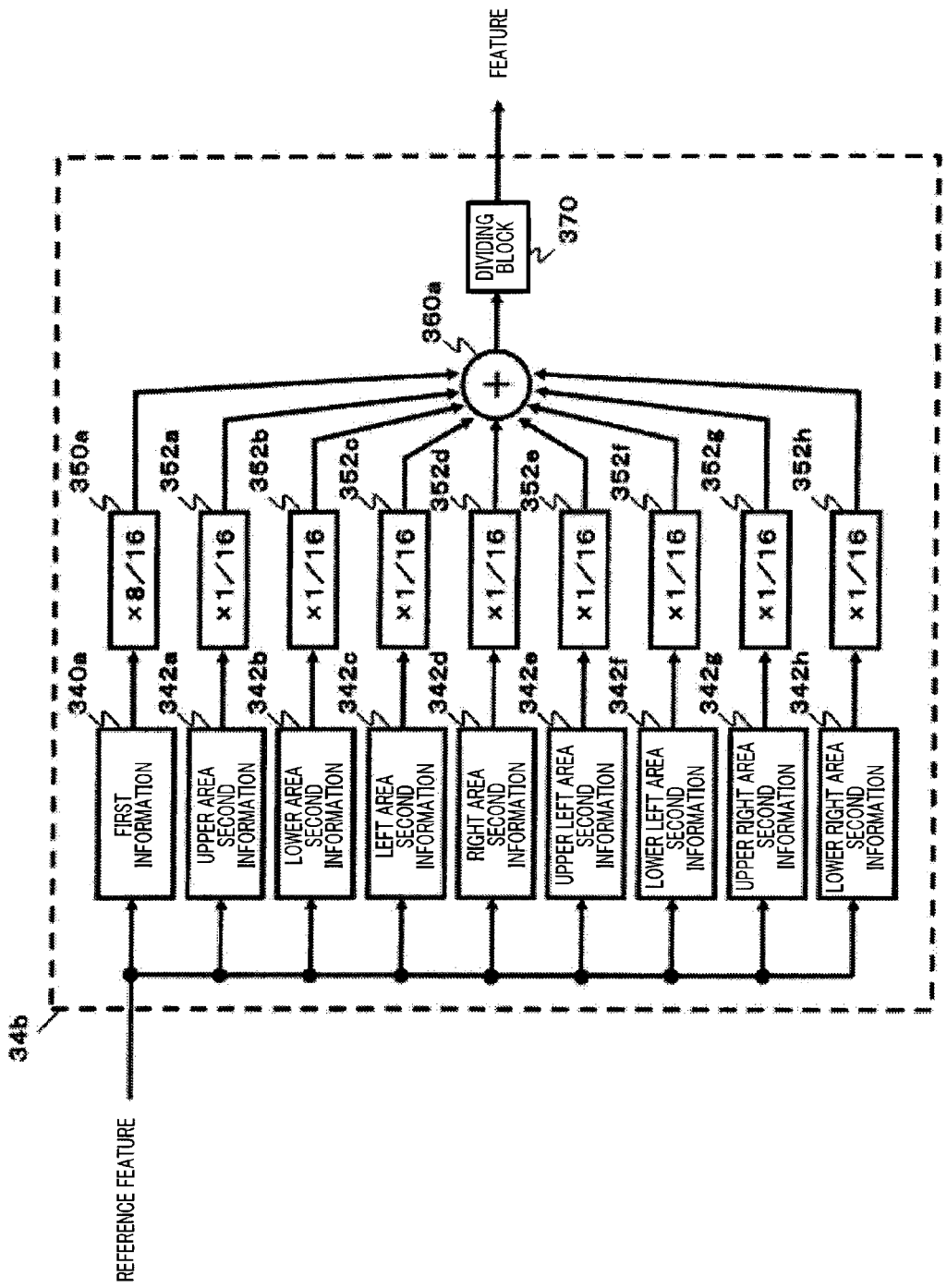
FIG. 25 is a configuration diagram showing another configuration example of a weighting section according to Embodiment 2.

Note that, with the present embodiment, instead of an average brightness value, a total of brightness signals (hereinafter "total brightness value") of pixels in each image display area may be used as a reference feature amount. In this case, using a total brightness value as a reference feature amount, the weighting section converts this total brightness value into an average value. FIG. 25 shows a specific configuration.

FIG. 25 is a configuration diagram showing the configuration of weighting section 34b used in case where a total brightness value is used as a reference feature amount. Weighting section 34b differs from weighting section 34a in having dividing block 370.

In case where the total brightness value is used as a reference feature amount, the first information and second information each serve as a total brightness value. Therefore, dividing block 370 of weighting section 34b averages the values outputted from adding block 360a to make the result equivalent to the feature amount matching one image display area. That is, dividing block 370 divides the addition result in adding block 360a, by the number of pixels in liquid crystal panel 10 included in all of the first image display area and eight second image display areas. This configuration can acquire the same result.

Embodiment 3

Next, Embodiment 3 (i.e. mode 1 where weights with respect to a reference bright value are changed based on ambient light) which is an example where the present invention is applied to a liquid display apparatus will be explained with reference to the accompanying drawings. Embodiment 3 differs from Embodiment 1 in providing an ambient light detecting section in a brightness determining section. The configuration of other components is the same as in Embodiment 1, and explanation thereof will be omitted.

The above visibility of "black floating" part significantly changes depending on the condition of ambient light in the surroundings of the liquid crystal display apparatus. That is, in environment where the luminance of ambient light in the surroundings is low, for example, when an image is viewed in a very dark room, "black floating" is more likely to be seen. By contrast with this, in environment where the luminance of ambient light in the surroundings is high, for example, when an image is viewed in a bright room, "black floating" is not likely to be seen.

Further, while contrast is recognized to be weak if peak brightness is low in environment where the luminance of ambient light in the surroundings is high, contrast is recognized to be strong even if peak brightness is low in environment where the luminance of ambient light in the surroundings is low.

Furthermore, in case where the sum of weights is assumed to be a predetermined value (for example, 1), the first weight becomes low and peak brightness becomes low if second weights (weights to be multiplied on second information) are made great, and the first weight becomes great and peak brightness becomes high if second weights are made low.

The liquid crystal display apparatus according to the present embodiment changes the first weight and second weights according to the luminance of ambient light to allow both reduction of the visibility of "black floating" and improvement of the visibility of contrast. To be more specific, in environment where the luminance of ambient light in the surroundings is low, the liquid crystal display apparatus according to the present embodiment increases second weights to reduce "black floating." By contrast with this, in environment where the luminance of ambient light in the surroundings is high, the liquid crystal display apparatus according to the present embodiment decreases second weights to increase peak brightness by intensively emitting light to areas that need more brightness, and allow image display of strong contrast.

Figure 26:
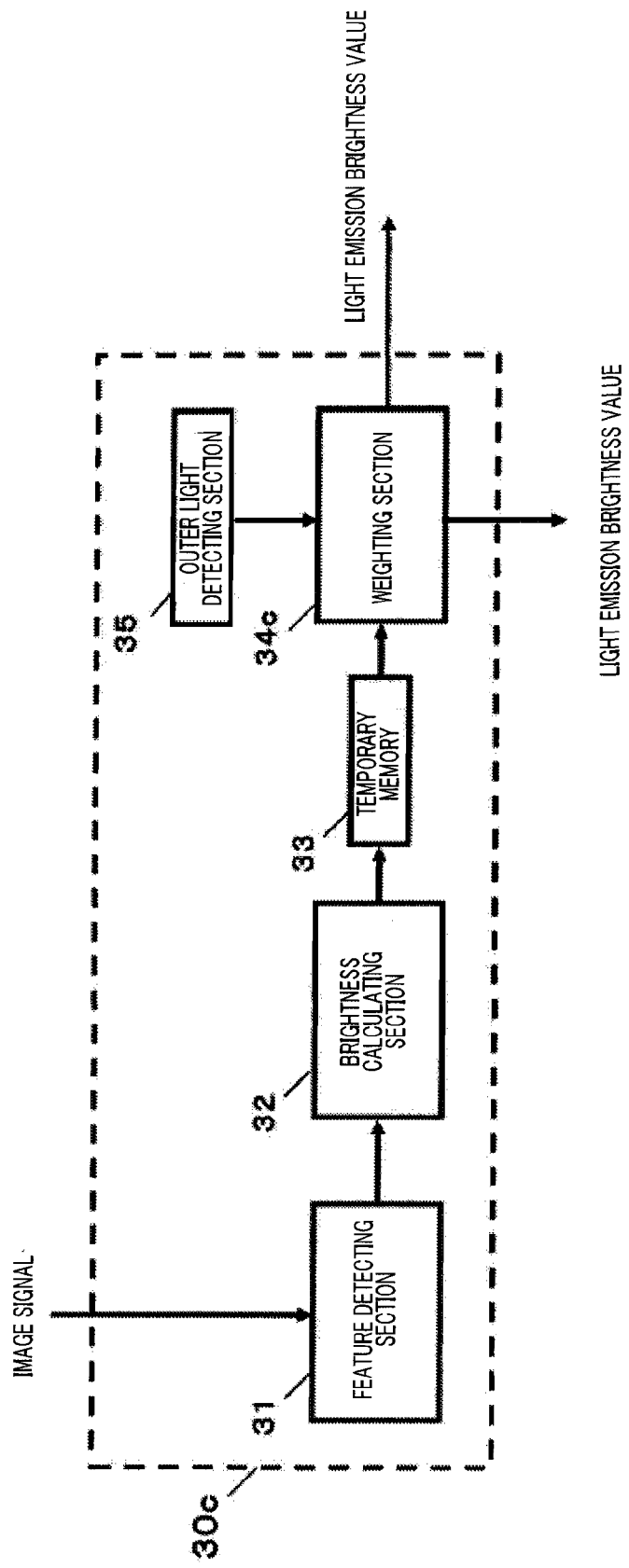
FIG. 26 is a configuration diagram showing a configuration of a brightness determining section according to Embodiment 3.

FIG. 26 is a configuration diagram showing a detailed configuration of brightness determining section 30c. Brightness determining section 30c has same feature detecting section 31, brightness calculating section 32 and temporary memory 33 as in Embodiment 1. Further, as a characteristic configuration, brightness determining section 30c has ambient light detecting section 35 and weighting section 34c that changes weights according to the detection result in ambient light detecting section 35.

Ambient light detecting section 35 detects the luminance in the surroundings of the liquid crystal display apparatus, and outputs an ambient light luminance value indicating the detection result, to weighting section 34c. Ambient light detecting section 35 is, for example, a luminance sensor that is placed on the display surface side of liquid crystal panel 10 and that uses photodiodes. Then, ambient light detecting section 35 detects luminance of ambient light radiated on the display surface side of liquid crystal panel 10. One ambient light detecting section 35 may be provided, and a plurality of ambient light detecting sections 35 may also be provided. When the liquid crystal display apparatus detects luminance in a plurality of locations, the liquid crystal display apparatus outputs, for example, the average value of detection results, to weighting section 34c as an ambient light luminance value.

Weight in each weighting block of weighting section 34c is variable. Here, weighting section 34c allows switching between the weighting (hereinafter "basic weighting") shown in FIG. 8, the weighting (hereinafter "high luminance weighting") shown in FIG. 19 and the weighting (hereinafter "low luminance weighting") shown in FIG. 20. With high luminance weighting, first weight is great and second weights are low compared to basic weighting. Further, with low luminance weighting, first weight is low and second weights are great compared to basic weighting.

Weighting section 34c receives the ambient light luminance value as input from ambient light detecting section 35. Then, weighting section 34c determines weight for each weighting block, based on the ambient light luminance value inputted. That is, weighting section 34c changes weights according to the ambient light luminance value inputted, such that second weights are great when the ambient light luminance value is small, and second weights are low when the ambient light luminance value is high.

Figure 27:
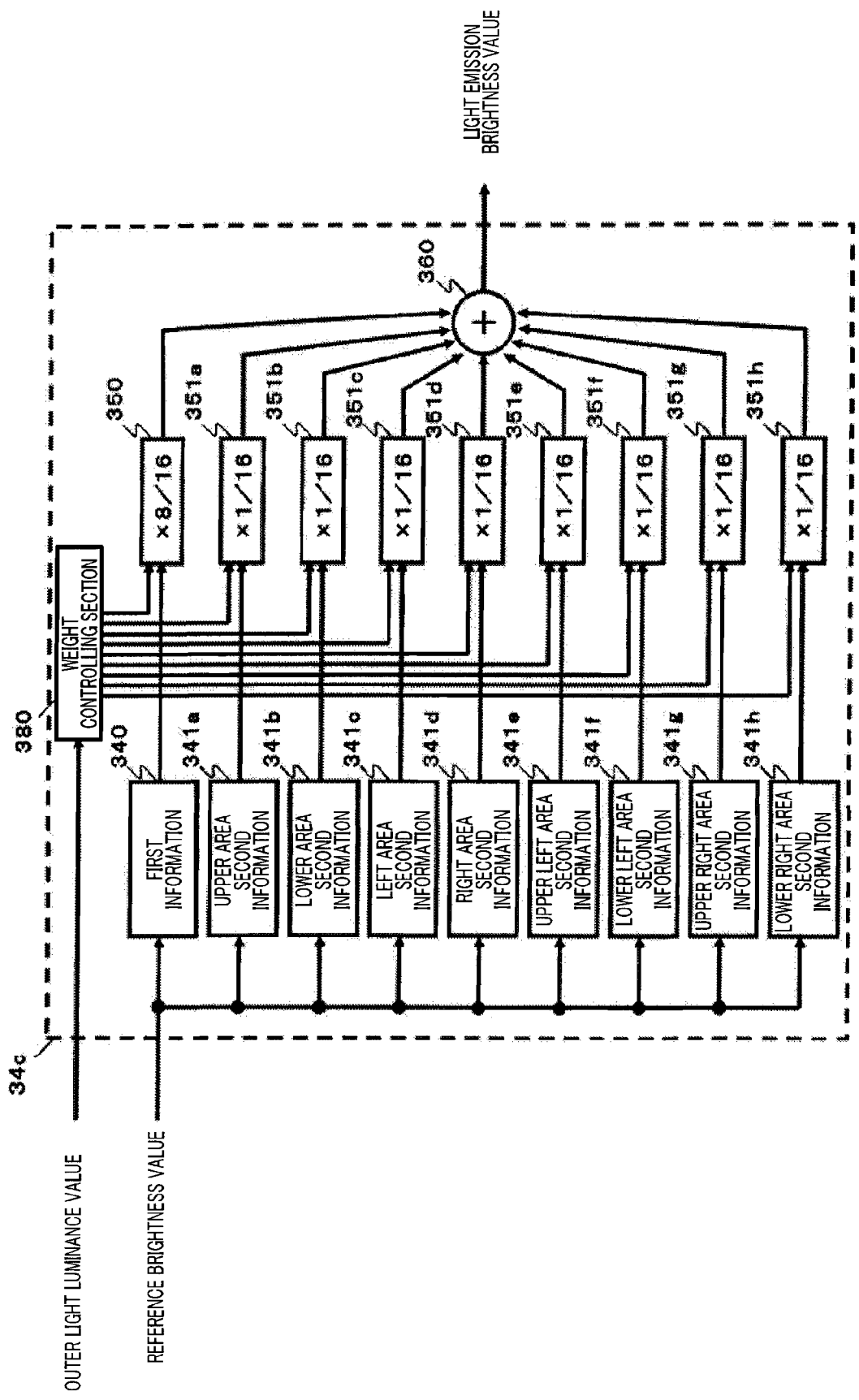
FIG. 27 is a configuration diagram showing a configuration of a weighting section according to Embodiment 3.

FIG. 27 is a configuration diagram showing a more detailed configuration of weighting section 34c according to the present embodiment, and matches FIG. 7 of Embodiment 1. With the present embodiment, first information weighting block 350 and second information weighting blocks 351a to 351h of weighting section 34c are configured to change weights according to the control signal. Further, weighting section 34c has weight controlling section 380 that receives the ambient light luminance value as input and outputs the control signal matching the ambient light luminance value inputted, to weighting blocks 350 and 351a to 351h.

Weight controlling section 380 sets in advance the range of the ambient light luminance value to which basic weighting (FIG. 8) is applied, as the basic luminance value. The basic luminance value and each weight can be determined based on the usual rule of thumb or result of experiment. Further, when ambient light luminance becomes high and the ambient light luminance value exceeds the basic luminance value, weight controlling section 380 outputs the control signal to switch weighting to apply, from basis weighting (FIG. 8) to high luminance weighting (FIG. 19). That is, weight controlling section 380 changes weighting such that second weights become low. As described above, this is because, in environment where the luminance of ambient light in the surroundings is high, while "black floating" is not likely to be seen, contrast is also not likely to be recognized.

By contrast with this, for example, when ambient light luminance becomes low and the ambient light luminance value goes below the basic luminance value, weight controlling section 380 outputs a control signal to switch weighting to apply, from basic weighting (FIG. 8) to low luminance weighting (FIG. 20). That is, weight controlling section 380 changes weights such that second weights become great. As described above, this is because, in environment where the luminance of ambient light in the surroundings is low, while contrast is likely to be recognized, "black floating" is also likely to be seen.

Figure 28:
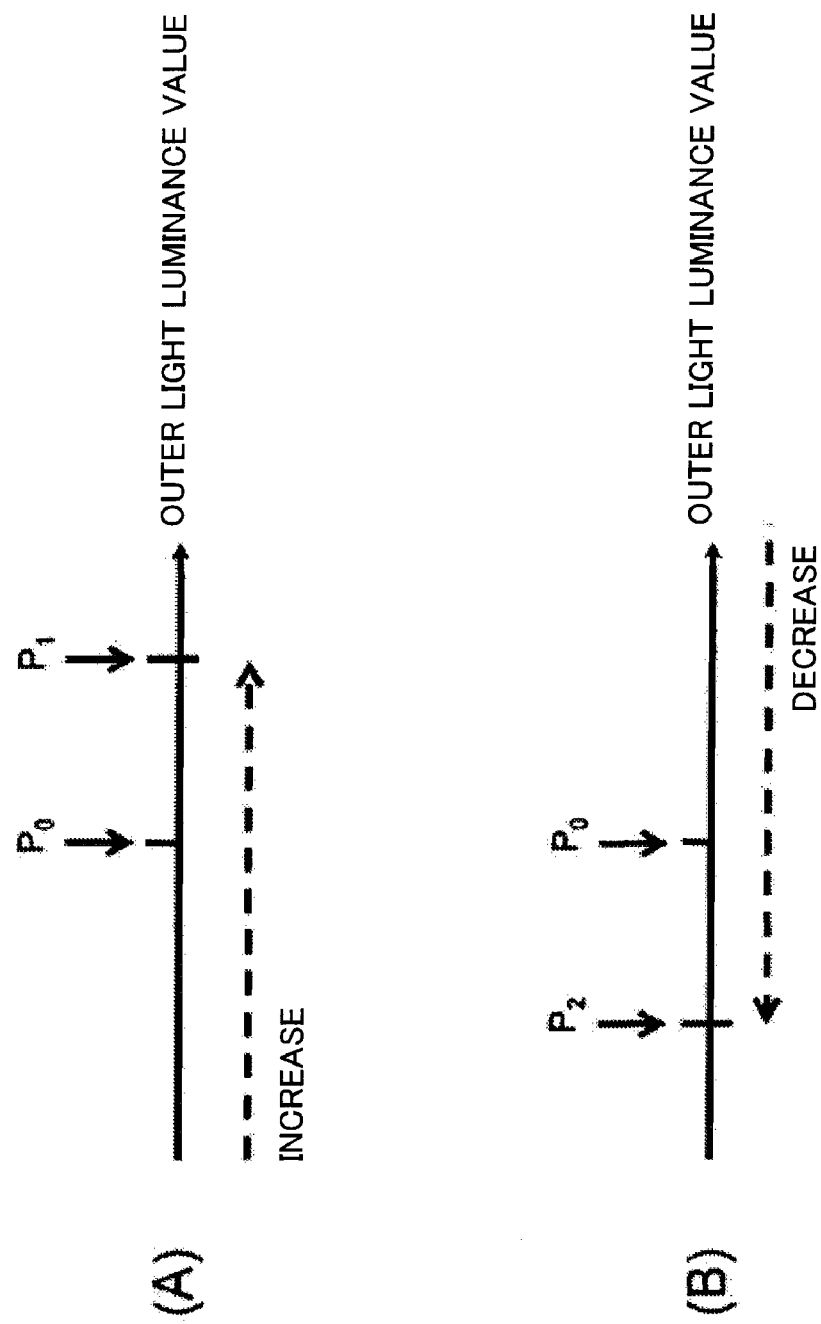
FIG. 28 shows an example of how weighting is switched according to Embodiment 3.

It is desirable to switch weighting as shown in, for example, FIG. 28. That is, preferably, the first threshold for switching weighting when the ambient light luminance value is increasing is made different from the second threshold for switching weighting when the ambient light luminance value is decreasing. To be more specific, as shown in FIG. 28A, when the ambient light luminance value is increasing, weight controlling section 380 switches weighting based on the ambient light luminance value (i.e. first threshold $P_1$) higher than basic luminance value $P_0$. Further, as shown in FIG. 28B, when the ambient light luminance value is decreasing, weight controlling section 380 switches weighting based on the ambient light luminance value (i.e. second threshold $P_2$) lower than the basic luminance value. By so doing, it is possible to prevent chattering upon switching near the basic luminance value.

To change weights, weight controlling section 380 uses, for example, a conversion table associating first weight and second weights. However, in case where a number of weighting patterns is less, if ambient light luminance changes, light emitting brightness changes substantially, thereby giving an impression of unnaturalness to viewers. Accordingly, weight controlling section 380 preferably uses the conversion table that associates first weight and second weights, in a more detailed manner with respect to an ambient light luminance value.

For example, when weight controlling section 380 uses the total value of first weight and second weights as a predetermined value (for example, 1), weight controlling section 380 can use a conversion table that associates only one of first weight and second weights with the ambient light luminance value.

FIG. 29 shows an example of characteristics of conversion tables for converting ambient light luminance values into second weight. In FIG. 29A to FIG. 29D, the horizontal axis indicates the ambient light luminance value, and the vertical axis indicates second weight.

Figure 29A:
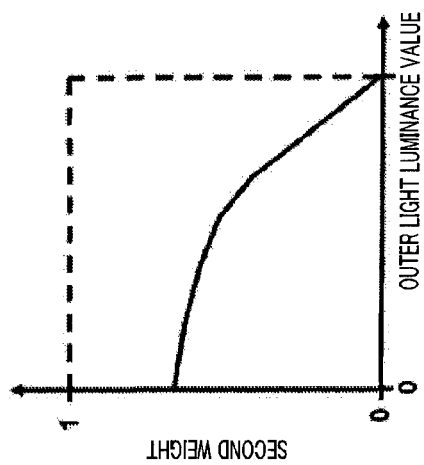
FIG. 29 shows an example of the characteristics of conversion tables for converting ambient light luminance values into second weights according to Embodiment 3.

FIG. 29A shows characteristics of a conversion table for decreasing second weight linearly with respect with respect to the increase in the ambient light luminance value. In case where this conversion table is used, it is possible to control weighting at ease.

Figure 29B:
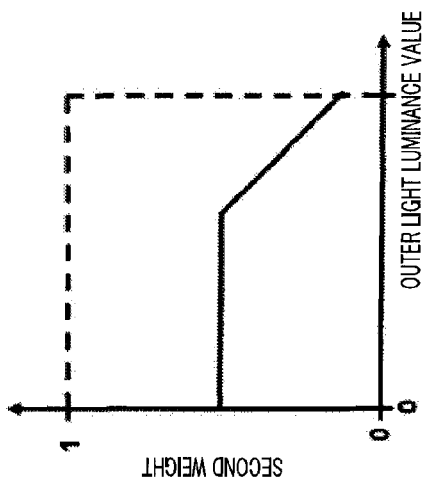

FIG. 29B shows characteristics of a conversion table for decreasing second weights non-linearly with respect to the increase in the ambient light luminance value. In case where this conversion table is used, when the ambient light luminance value is higher, the ratio of change in second weights is smaller. That is, when the ambient light luminance value is higher, it is possible to control weighting in a more detailed manner.

Figure 29C:
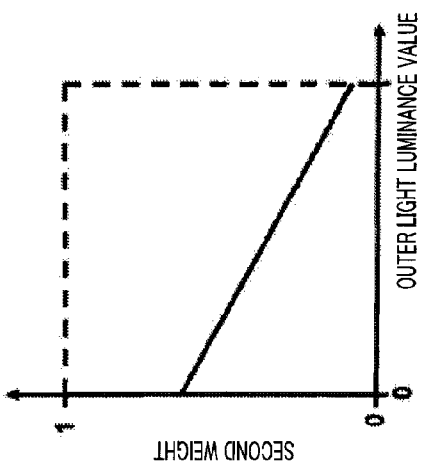

FIG. 29C shows characteristics of a conversion table for making second weights zero when the ambient light luminance value is equal to or greater than a predetermined threshold. In case where this conversion table is used, the influence of second information is not reflected in light emitting brightness under the circumstances where the ambient light luminance value is high. That is, the visibility of contrast at maximum can be prioritized the most when the ambient light luminance value is equal to or greater than a predetermined threshold. That is, in environment where black floating is not distinct, display is possible such that a part (part in which the reference brightness value is high) that must be originally made bright is made as bright as possible, and a part (part in which the reference brightness value is low) that must be originally made dark is made as dark as possible.

Figure 29D:
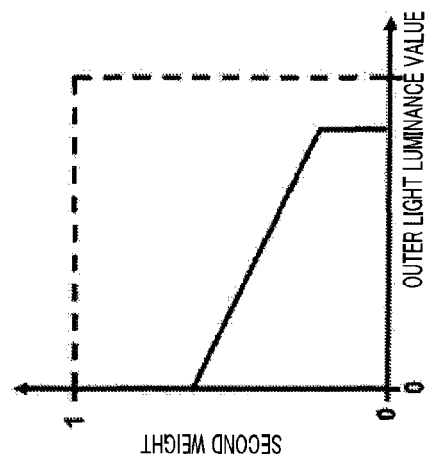

FIG. 29D shows characteristics of a conversion table that does not change second weights before the ambient light luminance value increases up to a predetermined value, and that changes second weights when the ambient light luminance value exceeds the predetermined value. In case where this conversion table is used, the visibility of contrast is prioritized in environment where ambient light luminance is particularly high, and constant weights are applied at all times in environment of general use. That is, it is readily possible to allow both control suitable for bright parts and control suitable for dark parts.

Note that weight controlling section 380 may provide a plurality of conversion tables of different characteristics shown in FIG. 29, and switch and use a conversion table for acquiring better image quality according to the state of images, the type and state of the display apparatus and user setting.

With this configuration, the liquid display apparatus according to the present embodiment can change the degree of influences by light emitting areas in the surroundings according to the luminance of ambient light, and allow both reduction of the visibility of "black floating" and improvement of the visibility of contrast.

Further, although a case has been explained with the present embodiment where conversion tables are used, the present invention is not limited to this. For example, using conversion functions having the above-described conversion characteristics, weighting section 34*c* may transform ambient light luminance values into first weight and second weights when necessary. According to this configuration, it is possible to reduce the capacity of the memory.

Although a configuration has been shown with the present embodiment where weight controlling section 380 outputs control signals unique to second information weighting blocks 351*a* to 351*h*, when second weights are made the same value at all times, weight controlling section 380 may output a common control signal to second information weighting blocks 351*a* to 351*h*.

Further, although, with the present embodiment, weighting blocks 350 and 351*a* to 351*h* are configured to change weights according to the control signals, weighting blocks 350 and 351*a* to 351*h* with a plurality of sets of different weighting may also be configured to switch the set to use.

Although the ambient light detecting section is installed on the display surface side of liquid crystal panel 10, the present invention is not limited to this. For example, the ambient light detecting section may be installed on the frame (not shown) provided outside the display surface of liquid crystal panel 10, or on the back surface cover (not shown) of liquid crystal panel 10.

Although the ambient light detecting section is a luminance sensor using photodiodes with the present embodiment, the present invention is not limited to this. For example, the ambient light detecting section may be a luminance sensor using phototransistors.

Although the sum of weights is made a constant value with the present embodiment, the present invention is not limited to this. It is equally possible to increase only second weights when ambient light luminance is high, and perform weighting such that the sum of weights is equal to or greater than one. By contrast with this, it is equally possible to decrease only second weights when ambient light luminance is low, and performs weighting such that the sum of weights is equal to or less than one.

Embodiment 4

Next, Embodiment 4 (i.e. mode 2 where weights with respect to the reference brightness value are changed based on ambient light) which is an example where the present invention is applied to a liquid crystal display apparatus will be explained with reference to the accompanying drawings. Although Embodiment 4 provides the ambient light detecting section like Embodiment 3, Embodiment 4 differs from Embodiment 3 in the method of changing weights according to the ambient light luminance value.

The liquid crystal display apparatus according to Embodiment 4 changes only second weights according to an ambient light luminance value, and does not change first weight. The configuration of other components is the same as in Embodiment 3, and explanation thereof will be omitted.

When peak brightness changes significantly, this may give viewers a sense of unnaturalness. By contrast with this, even if peak brightness is the same, how "black floating" becomes distinct is different depending on the ambient light luminance value.

Hence, the liquid crystal display apparatus according to the present embodiment maintains a peak brightness as much as possible, and changes the distribution of the differences in the light emission brightness between light emitting areas according to ambient light luminance. To be more specific, while maintaining the peak brightness as much as possible, the liquid crystal display apparatus according to the present embodiment distributes brightness in a wider range in environment where the luminance of ambient light in the surroundings is low, and concentrates luminance in a narrower range in environment where the luminance of ambient light in the surroundings is high. By this means, the liquid crystal display apparatus according to the present embodiment allows alleviation of change in a peak brightness, reduction of the visibility of "black floating" and improvement of the visibility of contrast.

With the present embodiment, assume that weighting section 34*c* applies weighting to the reference brightness value in light emitting areas of five rows and five columns. Further, weighting section 34*c* allows switching at least between the weighting (hereinafter "basic weighting") shown in FIG. 22, the weighting (hereinafter "high luminance weighting") shown in FIG. 30 and the weighting (hereinafter "low luminance weighting") shown in FIG. 31.

With low luminance weighting, second weights (hereinafter "internal second weight") for light emitting areas adjacent to the first light emitting areas are low, and second weights (hereinafter "external second weight") for light emitting areas outside those light emitting areas are low compared to basic weighting. Further, with high luminance weighting, internal second weights are low and external second weights are less than internal second weights compared to basic weighting. However, first weight is the same between basic weighting, high luminance weighting and low luminance weighting.

For example, when ambient light luminance is low and the ambient light luminance value goes below the basic luminance value, weighting section 34c switches weighting to apply, from basic weighting (FIG. 22) to low luminance weighting (FIG. 30). That is, weighting section 34c increases internal second weights and decreases external second weights. At this time, weighting section 34c does not change the first weight.

By contrast with this, when ambient light luminance is high and the ambient light luminance value exceeds the basic luminance value, weighting section 34c switches weighting to apply, from basic weighting (FIG. 22) to high luminance weighting (FIG. 31). That is, weighting section 34c decreases internal second weights and increases external second weights. At this time, weighting section 34c does not change first weight.

Accordingly, weighting section 34c applies these weighting according to the ambient light luminance value, and, consequently, can output a light emission brightness value such that brightness is distributed in environment where a peak brightness changes little and the luminance of ambient light in the surroundings is low, and the brightness is concentrated in environment where the luminance of ambient light in the surroundings is high.

By this means, the liquid crystal display apparatus according to the present embodiment can change the degree of influences of light emitting areas in the surroundings according to the luminance of ambient light and allow alleviation of change in the peak brightness, reduction of the visibility of "black floating" and improvement of the visibility of contrast.

Note that, similar to Embodiment 3, the liquid crystal display apparatus according to the present embodiment can change first weight according to the luminance of ambient light. Further, the liquid crystal display apparatus according to the present embodiment can apply the same weighting to a plurality of light emitting areas other than the light emitting areas of five rows and five columns. In any case, preferably, the liquid crystal display apparatus applies weighting such that the total value of first weight and all of second weights becomes one.

Embodiment 5

Next, Embodiment 5 (i.e. mode where the number of items of second information is changed based on ambient light) which is an example where the present invention is applied to a liquid crystal display apparatus will be explained with reference to the accompanying drawings.

Although the liquid crystal display apparatus according to Embodiment 5 has the ambient light detecting section similar to Embodiment 3, Embodiment 5 differs from Embodiment 3 in changing the number of items of second information (the number of second light emitting areas with the present embodiment) according to the detection result in the ambient light detecting section. The configuration of other components is the same as in Embodiment 3, and explanation thereof will be omitted.

In case where the weighting applied to five rows and five columns shown in FIG. 22 is changed to the weighting applied to five rows and five columns shown in FIG. 30 to concentrate the brightness, the distribution of weights becomes similar to the distribution of weights used in the weighting applied to three rows and three columns shown in FIG. 8.

Hence, the liquid crystal display apparatus according to the present embodiment changes the number of second light emitting areas, that is, the number of items of second information used to determine light emission brightness values of light emitting areas to illuminate the first image display area, according to the ambient light luminance value. To be more specific, the liquid crystal display apparatus according to the present embodiment increases the number of second light emitting areas to distribute the brightness in environment where the luminance of ambient light in the surroundings is low, and decreases the number of second light emitting areas to concentrate the brightness in environment where the luminance of ambient light in the surroundings is high. With this mode, it is possible to allow both reduction of the visibility of "black floating" and improvement of the visibility of contrast. Further, the liquid crystal display apparatus according to the present embodiment changes the number of second light emitting areas, so that it is possible to smoothly reduce the visibility of "black floating" and improve the visibility of contrast compared to the case where weights are changed within a determined range.

With the present embodiment, weighting section 34c allows switching of weighting at least between the weighting (hereinafter "basic weighting") applied to three rows and three columns shown in FIG. 8 and the weighting (hereinafter "enhanced weighting") applied to five rows and five columns shown in FIG. 22.

For example, when ambient light luminance becomes low and the ambient light luminance value exceeds the basic luminance value, weighting section 34c switches weighting to apply, from basic weighting (FIG. 8) to enhanced weighting (FIG. 22). That is, weighting section 34c increases the number of light emitting areas (i.e. second light emitting areas) in the surroundings of the first light emitting area, and changes second weights.

By this means, the liquid crystal display apparatus according to the present embodiment can change the degree of influences by surrounding light emitting areas according to the luminance of ambient light, reduce the visibility of "black floating" and improve the visibility of contrast.

Further, when ambient light in the surroundings is very bright and the ambient light luminance value is equal to or greater than a predetermined threshold, the weighting section may change weights such that second weights become zero. This is because "black floating" is very unlikely to be seen in this case. When second weights are made zero in this way, it is possible to decrease the number of weighted brightness values added in the adding block, and reduce processing load.

Further, the liquid crystal display apparatus according to the present embodiment may switch between three or more weighting patterns where the sizes of second areas are different. Further, it is also possible to combine the configuration of Embodiment 5 and the configuration of Embodiment 3 or 4. That is, it is possible to change the number of second light emitting areas while changing weighting.

Further, the liquid crystal display apparatus may not make the sum of the weights a constant value. For example, when ambient light luminance is high and the number of second light emitting areas is increased, the liquid crystal display apparatus sets second weights to the increased second light emitting areas, and does not change second weights for the other second light emitting areas. With this configuration, it is possible to reduce processing load for changing weights.

Other Embodiments

As described above, Embodiments 1 to 5 have been illustrated as embodiments of the present invention. However, the present invention is not limited to these embodiments. Therefore, a summary of one of other embodiments will be explained below.

A liquid crystal display apparatus according to another embodiment has the same configuration as in Embodiment 1 in which a feature detecting section determines the feature amount per image display area by applying a weight to an average brightness value and peak brightness value. Further, this liquid crystal display apparatus further has an ambient light detecting section, and employs a configuration of changing weights applied to these average brightness value and peak brightness value according to the detected ambient light luminance.

With this configuration, in case where ambient light luminance is high to an extent that "black floating" is not noticeable, a weight applied to a peak brightness value is increased, so that a feature amount of a minute white light spot can be increased to emit bright light. Consequently, it is possible to provide an optimal image matching ambient light luminance.

Further, a liquid crystal display apparatus according to another embodiment has the same configuration as in Embodiment 1, and employs a configuration where a feature detecting section determines feature amounts by applying weights to an average brightness value and peak brightness value per image display area. Further, this liquid crystal display apparatus employs a configuration for changing the first weight and second weights in a weighting section, depending on the weights applied to these average brightness value and peak brightness value.

By increasing the second weights when, for example, a weight applied to a peak brightness value is high, this configuration can provide an advantage of improving the steep change in brightness of light emitting areas that is produced when an object moves in case where a weight applied to the peak brightness value is increased. Consequently, it is possible to ensure both maintenance of a peak brightness and smooth motions on light emitting areas according to the motion of an image.

Further, although, with above Embodiment 1 to Embodiment 5, weights shown in, for example, FIG. 8, FIG. 19, FIG. 20, FIG. 21 and FIG. 30, are applied to the first light emitting area and second light emitting areas, the present invention is not limited to this. For example, assuming a feature amount of each image display area as image data, the liquid crystal display apparatus may reflect brightness signals of surrounding image display areas (i.e. second image display areas) in the light emission brightness of an image display area of interest (i.e. first image display area) using a band limiting filter. In this case, filter coefficients of the band limiting filter correspond to the weights in the above-described embodiments. To be more specific, for example, in case where a band limiting filter of horizontal three taps (i.e. three areas in the row direction) and vertical three taps (i.e. three areas in the column direction) is employed, the values shown in FIG. 14 correspond to filter coefficients.

INDUSTRIAL APPLICABILITY

The backlight apparatus and display apparatus according to the present invention can be utilized as a display apparatus for a liquid crystal television and liquid crystal monitor, and a backlight apparatus thereof.

REFERENCE SIGNS LIST

1 LIQUID CRYSTAL DISPLAY APPARATUS
10 LIQUID CRYSTAL PANEL
20 ILLUMINATING SECTION
21 LIGHT EMITTING SECTION
22 LED DRIVER
30, 30*a*, 30*c* BRIGHTNESS DETERMINING SECTION
31, 31*a* FEATURE DETECTING SECTION
32, 32*a* BRIGHTNESS CALCULATING SECTION
33, 33*a* TEMPORARY MEMORY
34, 34*a*, 34*b*, 34*c* WEIGHTING SECTION
35 AMBIENT LIGHT DETECTING SECTION
40 IMAGE SIGNAL CORRECTING SECTION
210 LED
340, 340*a* FIRST INFORMATION RETRIEVING BLOCK
341*a* to 341*h*, 342*a* to 342*h* SECOND INFORMATION RETRIEVING BLOCK
350, 350*a* FIRST INFORMATION WEIGHTING BLOCK
351*a* to 351*h*, 352*a* to 352*h* SECOND INFORMATION WEIGHTING BLOCK
360, 360*a* ADDING BLOCK
370 DIVIDING BLOCK
380 WEIGHT CONTROLLING SECTION
400 INPUT IMAGE
500*a*, 500*b* DISPLAY IMAGE900 INPUT IMAGE
910 BACKLIGHT
920 DISPLAY IMAGE

The invention claimed is:

1. A backlight apparatus comprising:
an illuminating section that radiates illumination light on a back of an optical modulating section which comprises a plurality of image display areas and which displays an image by modulating per image display area the illumination light according to an image signal; and
a brightness determining section that determines a light emission brightness value of the illuminating section and renews a light emitting state of the illuminating section based on the determined light emission brightness value, wherein:
the illuminating section comprises a plurality of light emitting areas illuminating the plurality of image display areas, respectively; and
the brightness determining section (i) applies a first weight for first information based on an input image signal of a first image display area and a second weight, independent from the first weight, for second information based on an input image signal of a second image display area, (ii) is configured to change the first weight and the second weight independently based on the first information and the second information respectively, and (iii) determines a light emission brightness value of a light emitting area illuminating a first image display area, from values acquired from the weights of the first weight and the second weight, and (iv) changes the weights such that the second weight is (a) increased in an environment where brightness of ambient light is lower than a first threshold and (b) decreased in an environment where the brightness of ambient light is higher than a second threshold that is different from the first threshold.

2. The backlight apparatus according to claim 1, wherein the brightness determining section changes the weights for the first information and the second information so that a greater weight is applied to the second information for lower luminance of the ambient light.

3. The backlight apparatus according to claim 1, wherein the brightness determining section changes the weights for the first information and the second information so that a weight of zero is applied to the second information for luminance of the ambient light equal to or greater than a predetermined threshold.

4. The backlight apparatus according to claim 1, wherein the brightness determining section comprises:
   a feature detecting section that detects a feature amount of an input image signal of each image display area;
   a brightness calculating section that calculates a reference brightness value of each light emitting area based on the feature amount; and
   a weighting section that determines the light emission brightness value of the first light emitting area, from values acquired by applying weights to a reference brightness value of the first light emitting area, which is the first information, and a reference brightness value of the second light emitting area, which is the second information.

5. The backlight apparatus according to claim 1, wherein the brightness determining section comprises:
   a feature detecting section that detects a reference feature amount of an input image signal of each image display area;
   a weighting section that determines a feature amount of the first image display area, from values acquired by applying weights to a reference feature amount of a first image display area, which is the first information, and a reference feature amount of a second image display area, which is the second information; and
   a brightness calculating section that calculates a light emission brightness value of each light emitting area based on the feature amount.

6. The backlight apparatus according to claim 1, wherein the second image display area includes an image display area adjacent to the first image display area.

7. The backlight apparatus according to claim 1, wherein the brightness determining section applies a lower weight than a weight for the first information, to the second information.

8. The backlight apparatus according to claim 1, wherein the brightness determining section applies a lower weight to the second information of the second image display area that is farther away from the first image display area.

9. The backlight apparatus according to claim 1, wherein the brightness determining section changes weights for the first information and the second information, based on the first information and the second information.

10. A display apparatus comprising:
    the backlight apparatus according to claim 1; and
    the optical modulating section.

* * * * *